(12) United States Patent
Johnston

(10) Patent No.: US 12,274,214 B2
(45) Date of Patent: Apr. 15, 2025

(54) HYDROPONIC TOWER ASSEMBLIES AND METHODS

(71) Applicant: Urban Geoponic LLC, Englewood, CO (US)

(72) Inventor: Jeff Johnston, Denver, CO (US)

(73) Assignee: URBAN GEOPONIC LLC, Englewood, CO (US)

( * ) Notice: Subject to any disclaimer, the term of this patent is extended or adjusted under 35 U.S.C. 154(b) by 762 days.

(21) Appl. No.: 17/272,725

(22) PCT Filed: Sep. 5, 2019

(86) PCT No.: PCT/US2019/049646
§ 371 (c)(1),
(2) Date: Mar. 2, 2021

(87) PCT Pub. No.: WO2020/051271
PCT Pub. Date: Mar. 12, 2020

(65) Prior Publication Data
US 2021/0345569 A1 Nov. 11, 2021

Related U.S. Application Data

(60) Provisional application No. 62/856,965, filed on Jun. 4, 2019, provisional application No. 62/728,517, filed on Sep. 7, 2018.

(51) Int. Cl.
*A01G 31/06* (2006.01)
(52) U.S. Cl.
CPC .................................. *A01G 31/06* (2013.01)
(58) Field of Classification Search
CPC .. A01G 31/02; A01G 31/06; A01G 2031/006; A01G 31/04; A01G 31/045;
(Continued)

(56) References Cited

U.S. PATENT DOCUMENTS 5,363,594 A * 11/1994 Davis .................... A01G 9/022
47/82
8,327,582 B2 12/2012 Storey
(Continued)

FOREIGN PATENT DOCUMENTS

| CN | 105638423 | 6/2016 |
| WO | 20160100535 | 4/2016 |
| WO | 2016081234 | 5/2016 |

OTHER PUBLICATIONS

Hydrofarm GCTB2 Heavy Duty Tomato Barrel with 4' Tower, Oct. 2, 2016, amazon.com, May 24, 2022, www.annazon.conn/lydrofarnn-GCTB2-Heavy-Tomato-Barrel/dp/B076VZHB58/.
(Continued)

*Primary Examiner* — Trinh T Nguyen
(74) *Attorney, Agent, or Firm* — Bryan Cave Leighton Paisner LLP

(57) ABSTRACT

A hydroponic tower includes opposed parallel first and second sides extending from a top end of the hydroponic tower to a bottom end of the hydroponic tower. The first side includes at least one growing slot extending therethrough. Opposed parallel third and fourth sides are adjacent each of the first and second sides and extend from the top end of the hydroponic tower to the bottom end of the hydroponic tower such that the hydroponic tower has a rectangular cross section. The first, second, third, and fourth sides define a hollow interior. The third side includes at least one growing slot extending therethrough. The at least one growing slots of the first and third sides are in communication with the hollow interior.

11 Claims, 21 Drawing Sheets

(58) Field of Classification Search
CPC ...... A01G 31/042; A01G 9/022; A01G 9/023;
A01G 9/024; A01G 9/02; A01G 9/0293;
A01G 27/04; A01G 9/025; A01G 9/047;
A01G 9/021
See application file for complete search history.

(56) References Cited

U.S. PATENT DOCUMENTS

| | | | |
|---|---|---|---|
| 8,365,466 | B1 | 2/2013 | Storey |
| 9,220,207 | B2 | 12/2015 | Storey |
| 9,288,948 | B2 | 3/2016 | McNamara et al. |
| 9,380,751 | B2 | 7/2016 | Storey |
| 9,491,915 | B2 | 11/2016 | Storey |
| D785,497 | S | 5/2017 | Storey |
| D796,378 | S | 9/2017 | Storey |
| 9,883,642 | B2 | 2/2018 | Friedman |
| D821,915 | S | 7/2018 | Storey |
| D826,769 | S | 8/2018 | Storey |
| 10,047,943 | B2 | 8/2018 | Storey et al. |
| 10,080,332 | B1 | 9/2018 | Yi et al. |
| D832,738 | S | 11/2018 | Storey |
| 10,172,301 | B2 | 1/2019 | McNamara et al. |
| 10,234,125 | B2 | 3/2019 | Smith et al. |
| D916,510 | S | 4/2021 | Chiang |
| D938,187 | S | 12/2021 | Pape |
| D945,920 | S | 3/2022 | Tice |
| 2008/0262924 | A1 | 10/2008 | Leonard |
| 2010/0132255 | A1* | 6/2010 | Webber ............... A01G 9/023 47/29.1 |
| 2010/0236147 | A1 | 9/2010 | Brusatore |
| 2012/0095897 | A1 | 4/2012 | Barrow |
| 2013/0067813 | A1 | 3/2013 | Storey |
| 2014/0130414 | A1 | 5/2014 | Storey |
| 2015/0223418 | A1 | 8/2015 | Collins et al. |
| 2015/0334930 | A1 | 11/2015 | Stoltzfus et al. |
| 2016/0073589 | A1 | 3/2016 | McNamara et al. |
| 2016/0100535 | A1 | 4/2016 | Daugirdas |
| 2016/0198656 | A1 | 7/2016 | McNamara et al. |
| 2017/0055474 | A1 | 3/2017 | Storey |
| 2017/0290275 | A1 | 10/2017 | Storey |
| 2017/0303478 | A1 | 10/2017 | Smith et al. |
| 2017/0332568 | A1 | 11/2017 | Storey |
| 2018/0014471 | A1 | 1/2018 | Jensen et al. |
| 2018/0014485 | A1 | 1/2018 | Whitcher et al. |
| 2018/0014486 | A1 | 1/2018 | Creechley et al. |
| 2018/0017244 | A1 | 1/2018 | Smith et al. |
| 2018/0213734 | A1 | 8/2018 | Smith et al. |
| 2019/0269079 | A1 | 9/2019 | Klein et al. |
| 2019/0269080 | A1 | 9/2019 | Whitworth et al. |
| 2019/0269081 | A1 | 9/2019 | Whitworth et al. |
| 2019/0269082 | A1 | 9/2019 | Klein et al. |
| 2019/0387688 | A1 | 12/2019 | White |
| 2019/0387689 | A1 | 12/2019 | Matera et al. |
| 2020/0008366 | A1 | 1/2020 | Klein et al. |
| 2020/0352122 | A1 | 11/2020 | Matera et al. |
| 2021/0256781 | A1 | 8/2021 | Jörn |

OTHER PUBLICATIONS

Umbrella Stands Umbrella Stand Rectangular Wrought Iron, Dec. 4, 2021, amazon.ca, May 24, 2022, www.annazon.ca/Unnbrella-Rectangular-Household-Business-Rennovable/dp/B09MZWHHBB/.
Patent Cooperation Treaty, International Search Report for PCT/US2019/049646, 3 pages Dec. 24, 2019.

* cited by examiner

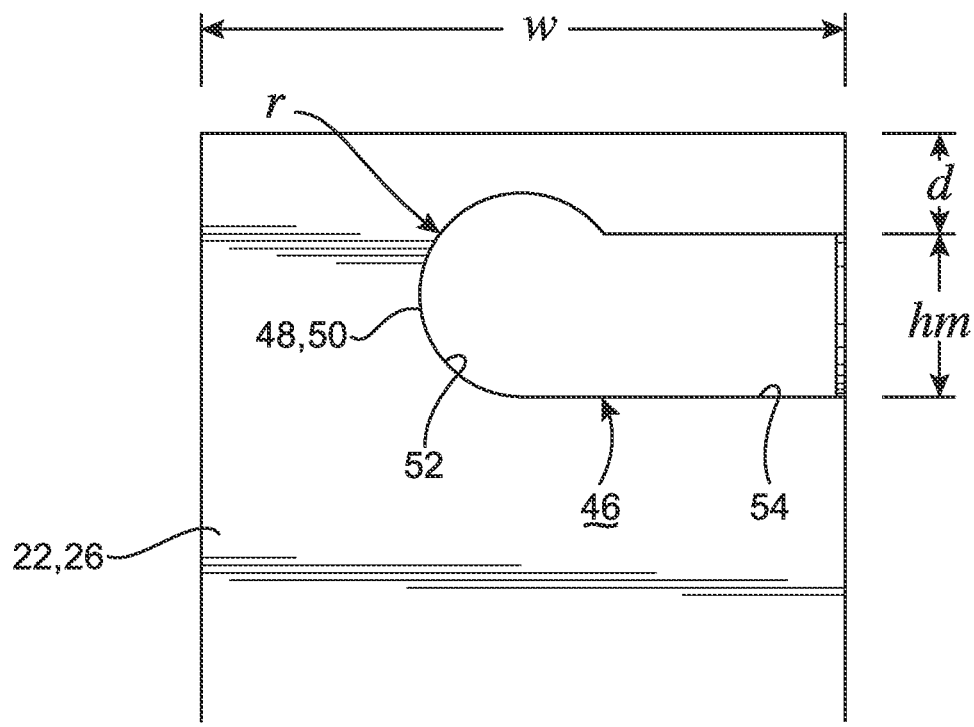
FIG. 7
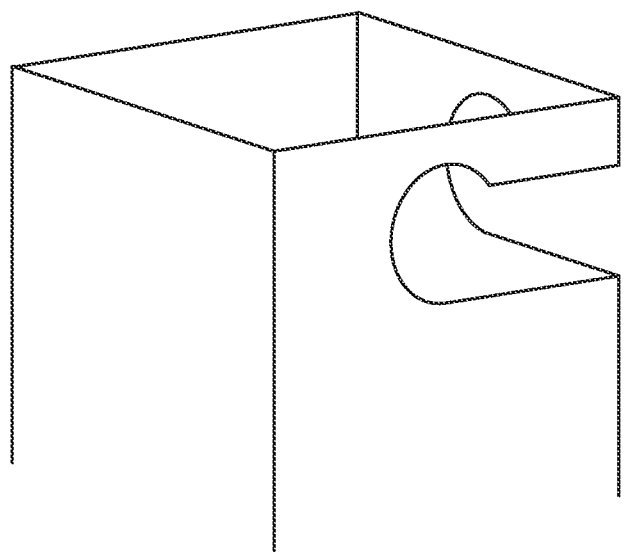

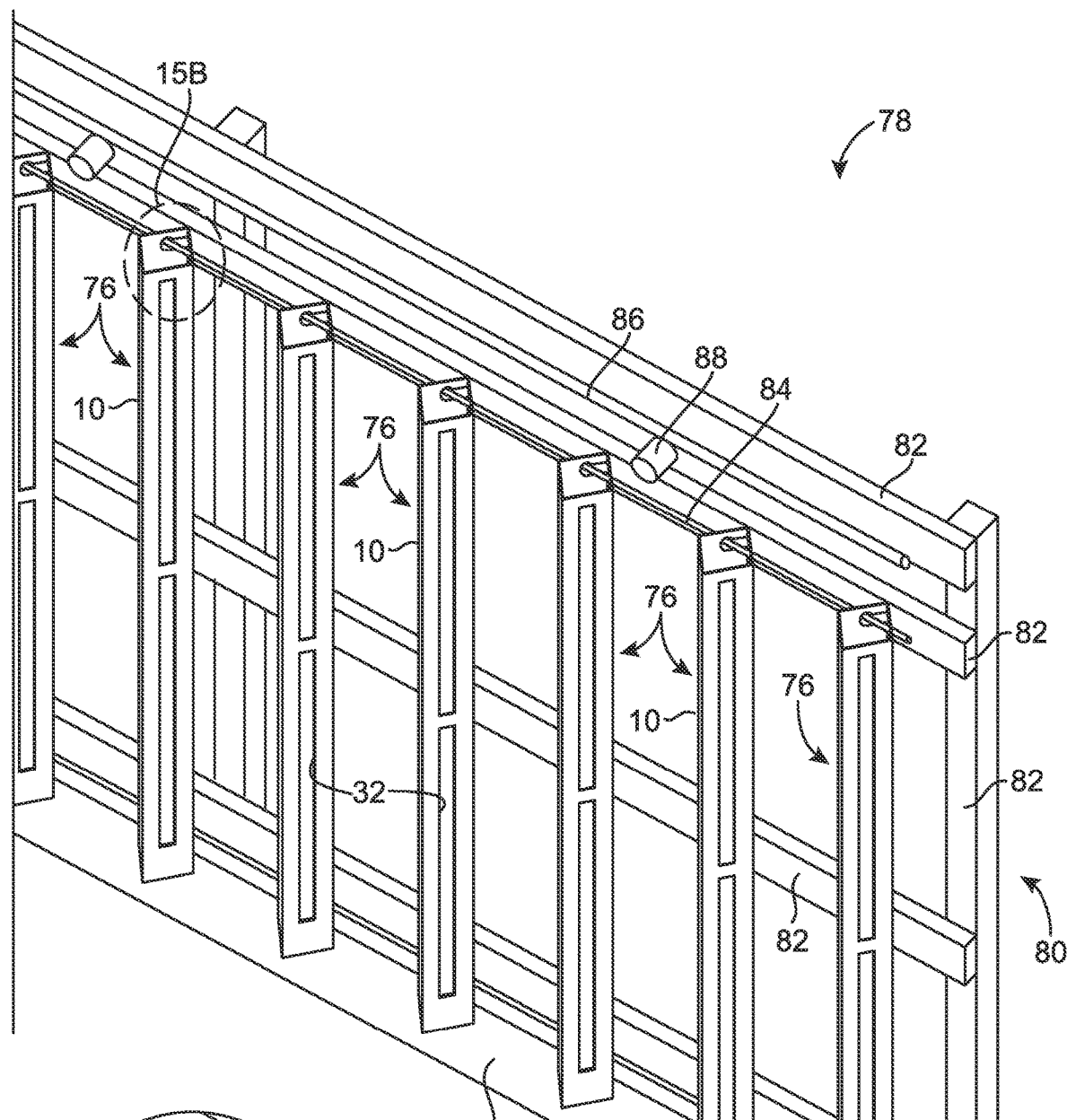
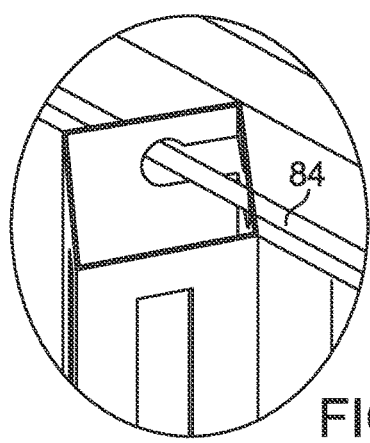
FIG. 15A
FIG. 15B

HYDROPONIC TOWER ASSEMBLIES AND METHODS

CROSS REFERENCE TO RELATED APPLICATIONS

This application is a U.S. National Phase Application of International Application PCT Application No. PCT/US2019/049646 filed on Sep. 5, 2019, which claims the benefit of priority from U.S. Provisional Application No. 62/728,517 filed on Sep. 7, 2018 and U.S. Provisional Application No. 62/856,965 filed on Jul. 4, 2019. The disclosures of which are incorporated herein by reference.

FIELD

The present disclosure generally relates to plant production, and more particularly to apparatuses and methods for hydroponic plant production.

BACKGROUND

Hydroponic plant production refers to a method of growing plants without soil. Plants (for example, produce for food consumption) can be inserted into a growing medium and a nutrient solution is used to grow the plants. Traditional hydroponics utilizes horizontal production techniques, either through static solution or continuous-flow solution. Vertical hydroponic towers have been introduced as space-saving hydroponic apparatuses. However, current vertical hydroponic towers cannot produce high quantities of plants/produce.

SUMMARY

Among the various aspects of the present disclosure is the provision of an apparatus or assembly for hydroponic plant production as substantially shown and described.

Briefly, therefore, one aspect of the disclosure is directed to a hydroponic tower that includes opposed parallel first and second sides extending from a top end of the hydroponic tower to a bottom end of the hydroponic tower. The first side includes at least one growing slot extending therethrough. Opposed parallel third and fourth sides are adjacent each of the first and second sides and extend from the top end of the hydroponic tower to the bottom end of the hydroponic tower such that the hydroponic tower has a rectangular cross section. The first, second, third, and fourth sides define a hollow interior. The third side includes at least one growing slot extending therethrough. The at least one growing slots of the first and third sides are in communication with the hollow interior.

In another aspect, a hydroponic tower includes a rectangular tube having growing slots in a first pair of adjacent sides, the adjacent sides being generally perpendicular to each other.

In another aspect, a hydroponic tower assembly includes a hydroponic tower comprising a rectangular tube having growing slots in a first pair of adjacent sides. A growing medium is positioned within a hollow interior of the hydroponic tower.

In another aspect, a growing assembly includes a base comprising vertical and horizontal supports and having a mounting bar secured to a horizontal support. A hydroponic tower assembly is attached to the base at an angle. The hydroponic tower assembly includes a hydroponic tower comprising a rectangular tube having growing slots in a first pair of adjacent sides and a mounting slot extending between a second pair of adjacent sides. The mounting slot receives the mounting bar of the base to attach the hydroponic tower assembly to the base at an angle, such that none of the sides of the hydroponic tower are parallel to the mounting bar. A growing medium is positioned within a hollow interior of the hydroponic tower. A trough is attached to the base and positioned below a bottom end of the hydroponic tower. An irrigation pipe is attached to the base and positioned above a top end of the hydroponic tower, the irrigation pipe including nozzles positioned to distribute a nutrient solution to the top end of the hydroponic tower.

In another aspect, a method of assembling a hydroponic tower assembly includes providing a hydroponic tower comprising a rectangular tube having growing slots in a first pair of adjacent sides and providing a growing medium section. First and second plant openings are created in the growing medium section. The growing medium section is inserted into a hollow interior of the hydroponic tower such that the first and second plant openings align with the growing slots.

Other objects and features will be in part apparent and in part pointed out hereinafter.

BRIEF DESCRIPTION OF THE DRAWINGS

These and other features, aspects and advantages of the disclosure will become more fully apparent from the following detailed description, appended claims, and accompanying drawings, wherein the drawings illustrate features in accordance with exemplary aspects of the disclosure, and wherein:

FIG. 7 is an enlarged detail of a portion of FIG. 6;

FIG. 15A is a perspective view of a growing assembly;

FIG. 15B is an enlarged perspective view of a section of the growing assembly of FIG. 15A;

Like reference numerals indicate corresponding parts throughout the several views of the drawings.

DETAILED DESCRIPTION

Figure 1:
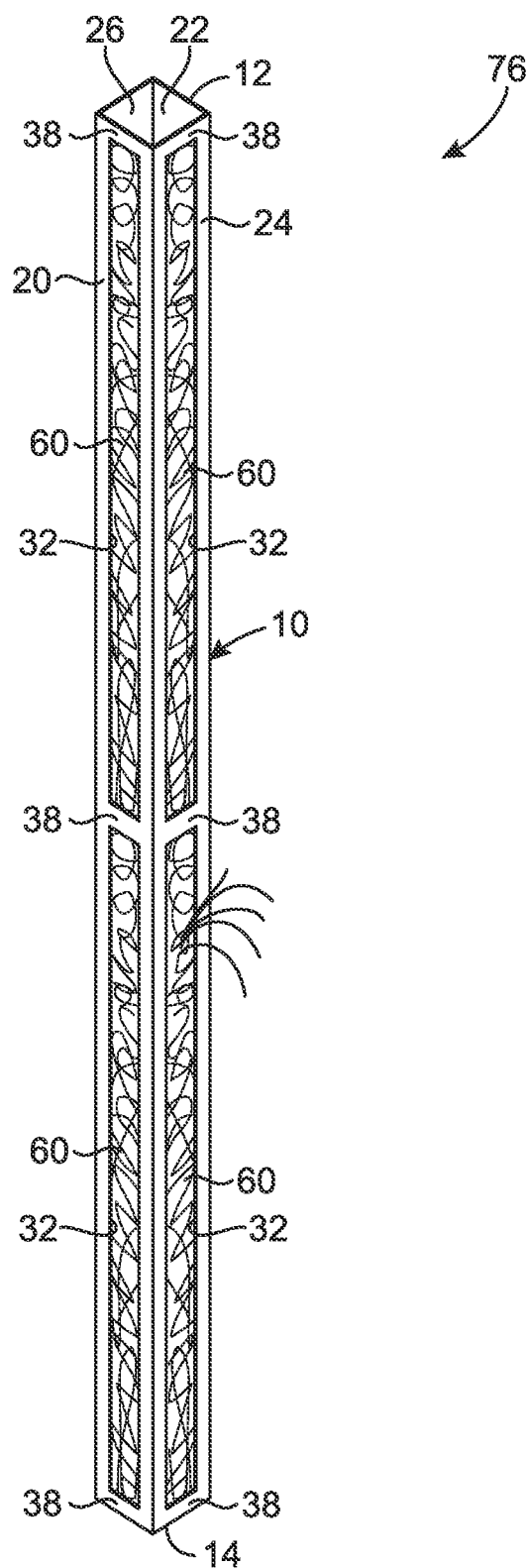
FIG. 1 is a perspective view of a hydroponic tower assembly according to an embodiment.

The accompanying Figures and this description depict and describe aspects of apparatuses and methods in accordance with the present disclosure, and features and components thereof. It should also be noted that any references herein to front and back, right and left, top and bottom and upper and lower are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Referring to FIGS. 1-21, a hydroponic tower for growing plants is shown generally at 10. The tower 10 is generally rectangular in shape and extends from a top end 12 to a bottom end 14 along a longitudinal axis 16. The tower 10 can be made of plastic, e.g., polyvinyl chloride (PVC), or any other suitable material. The tower 10 is configured for use, alone or in a hydroponic or growing assembly, to grow plants, as described in more detail below. Although illustrated as generally rectangular in shape, it is understood that the tower 10 can have different shapes within the scope of the present invention.

As illustrated in FIGS. 1-6, the hydroponic tower 10 includes sides extending from the top end 12 to the bottom end 14. In the illustrated embodiment, the tower 10 includes first and second sides 20, 22 in opposed facing relationship, and third and fourth sides 24, 26 in opposed facing relationship and adjacent each of the first and second sides. The sides 20, 22, 24, 26 are preferably unitary and integrally formed, although other configurations are within the scope of the present invention. The sides 20, 22, 24, 26 define a hollow interior 30 of the tower 10. The sides 20, 22, 24, 26 form a rectangular cross section for the tower 10 and extend around the longitudinal axis 16 to define the hollow interior 30. First and second sides 20, 22 are generally parallel to each other and third and fourth sides 24, 26 are generally parallel to each other. The parallel first and second sides 20, 22 are generally perpendicular to the parallel third and fourth sides 24, 26. In the illustrated embodiment, the top and bottom ends 12, 14 are open. Each of the sides 20, 22, 24, 26 has a width extending transverse to the longitudinal axis 16 and a length extending parallel to the longitudinal axis. In the illustrated embodiment, each side has a width w and a length l that is the same for all of the sides. As such, in the illustrated embodiment, the tower 10 has a square cross section, although other shapes are within the scope of the present invention. In one embodiment, the width w of each side 20, 22, 24, 26 is in the range of about 4 inches to about 7 inches, such as about 4 inches. In one embodiment, the length l of each side 20, 22, 24, 26 is in the range of about 4 feet to about 8 feet, such as about 4 feet, 6 feet, or 8 feet. Other configurations are within the scope of the present invention, such as the sides having widths and/or lengths that differ from each other. In one embodiment, the tower comprises a rectangular PVC tube having open ends and a hollow interior. By way of example, the tower can comprise a 4 inch square PVC tube having a thickness in the range of about 0.125 inches to about 0.250 inches and a length of 8 feet. It is understood that the tower can have different dimensions, can be scaled up, and/or can be scaled down within the scope of the present invention.

In yet another embodiment, the tower 10 can have a circular and/or rounded cross-section, such as for example in a case where the tower comprises an elongated cylindrical tube with slots therein (not shown). For example, in such an embodiment, an elongated cylindrical tube comprising a hollow interior can comprise opposed parallel first and second sides 20, 22 of a cylindrical wall of the tower that extend from a top end 12 of the hydroponic tower to the bottom end 14 of the tower, with the first side including at least one growing slot 32 extending along a vertical length of the tower. For example, the first side may be disposed at a first arc segment of the cylindrical wall, and the second side may be disposed at a second arc segment of the cylindrical wall that is opposing the first arc segment. The cylindrical tower can further comprise opposed parallel third and fourth sides 24, 26 of the cylindrical tower wall that are adjacent each of the first and second sides 20, 22, and extending from the top end of the hydroponic tower to the bottom end of the hydroponic tower. For example, the third side may be disposed at a third arc segment of the cylindrical wall that is between the first and second arc segments, and the fourth side may be disposed at a fourth arc segment of the cylindrical wall that is between the first and second arc segments and opposing the third arc segment, such as in a case where each of the first, second, and third arc segments corresponding to an approximately 90° arc segment of the cylindrical wall. The third side can further including at least one growing slot extending therethrough, and at least one growing slot in the first and third sides of the cylindrical wall are in communication with the hollow interior. Accordingly, in certain embodiments, a tower having a cylindrical cross-section may utilize the structures and/or configurations described for the tower 10 having a rectangular cross-section as exemplified herein. According to yet another embodiment, the tower 10 can have a substantially rectangular cross-section, but with rounded corners where each of the first and third sides, third and second sides, second and fourth sides, and fourth and first sides meet. According to a further embodiment, one or more of the first, second, third and/or fourth sides may be rounded (e.g., having a rounded cross-section), while one or more remaining sides are at right angles to one another, and other combinations thereof may also be provided.

The tower 10 includes growing slots, openings, or channels in two adjacent sides. In the illustrated embodiment, the adjacent sides are generally perpendicular to each other (e.g., the generally perpendicular adjacent first and third sides 20, 24). One pair of adjacent sides includes growing slots. For ease of reference, the tower 10 as described herein refers to adjacent sides 20, 24 as including the growing slots. It is understood that any pair of adjacent sides can include growing slots within the scope of the present invention. In the illustrated embodiments, the adjacent first and third sides 20, 24 each include at least one growing slot 32 in communication with the hollow interior 30 of the tower 10. Each of the at least one growing slots 32 extends vertically along a length of the respective side from a first or top end 34 to a second or bottom end 36. As illustrated, the growing slots 32 do not extend along the entire length l of the respective side. The growing slots 32 have a width extending transverse to the longitudinal axis and parallel to the width of the respective side, and a length extending parallel to the longitudinal axis and the length of the respective side. Preferably, the width of the slot 32 is less than the width of the respective side and the length of the slot is less than the length of the respective side. In the illustrated embodiment, each of the growing slots 32 in the tower 10 has an identical width ws, and each of the growing slots has an identical length ls, although other configurations are within the scope of the present invention. For example, the width ws of each growing slot 32 can be in the range of about 1 inch to about 2 inches, such as about 1.25 inches or about 1.75 inches. The growing slots 32 are preferably centered horizontally in the respective side, although other configurations are possible. The length ls of each growing slot can be in the range of about 24 inches to 93 inches, such as about 2 feet, 6 inches or about 3 feet, 10.125 inches. As discussed in further detail below, each of the adjacent sides can include one or more growing slots 32. In one embodiment, each adjacent side includes one growing slot having a length ls in the range of about 85 inches to about 93 inches. In another embodiment, each adjacent side includes two growing slots 32 each having a length ls in the range of about 30 inches to about 47 inches. In another embodiment, each adjacent side includes three growing slots 32 each having a length ls in the range of about 24 to 30 inches. Other configurations and dimensions are within the scope of the present invention.

Figure 2:
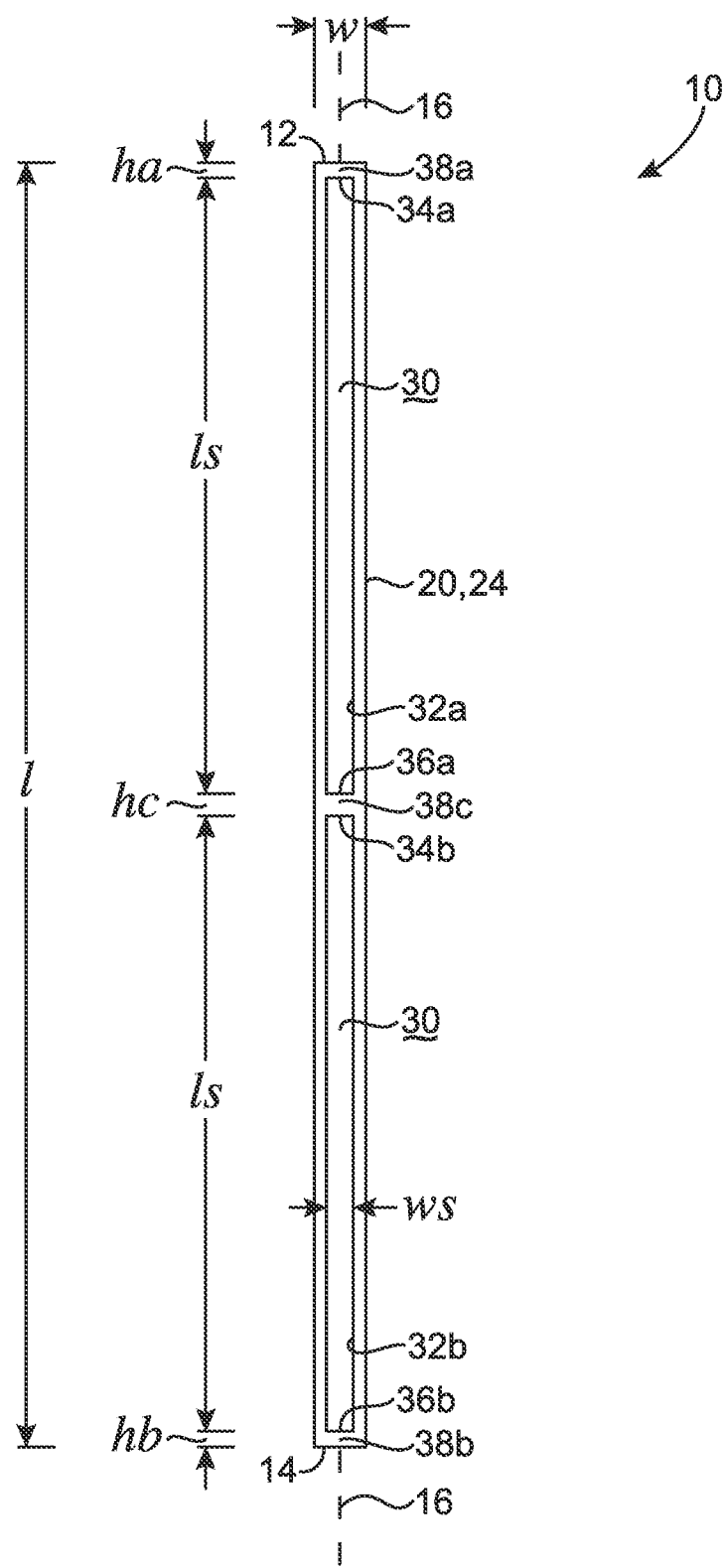
FIG. 2 is a front elevation of a hydroponic tower.

As shown in FIGS. 1 and 2, in one embodiment the slotted first and third sides 20, 24 each include two growing slots 32 and multiple unslotted or support sections 38. As illustrated, the top end 34a of the first or upper growing slot 32a is spaced from the top end 12 of the tower 10, such that an unslotted section of the side (i.e., support section 38a) remains at the top end of the tower. Similarly, the bottom end 36b of the second or lower growing slot 32b is spaced from the bottom end 14 of the tower 10, such that an unslotted section of the side (i.e., support section 38b) remains at the bottom end of the tower. In addition, the bottom end 36a of the upper growing slot 32a is spaced from the top end 34b of the lower growing slot 32b, such that an unslotted section of the side (i.e., support section 38c) remains in the center of the tower 10. The support sections 38 provide structural support to the tower 10 to prevent the tower from warping, buckling, expanding, or otherwise deforming due to the growing slots 32 and/or due to the insertion of growing medium and/or plants in the hollow interior as described below. The support sections 38 can be so configured and dimensioned so as to provide structural support to the tower 10. For example, each support section 38 can have a height extending along a length of the respective side in the range of about 1 inch to about 2 inches. Preferably, each support section has a width that is co-extensive with the width of the respective side. In one embodiment, the support sections at the top and bottom of the tower 10 (e.g., support sections 38a and 38b in FIG. 2) have identical heights. In one embodiment, each support section in between the more than one growing slots 32 on a side (e.g., support section 38c in FIG. 2) has a height greater than the top and bottom support sections. In one embodiment, all support sections on a side have identical heights (see, e.g., FIG. 4). In one embodiment, all support sections on a side have different heights. In one embodiment, each of the adjacent first and third sides 20, 24 includes two growing slots 32a, 32b, the top support section 38a has a height ha of about 1.125 inches, the bottom support section 38b has a height hb of about 1.125 inches, and the support section 38c between the two growing slots has a height hc of about 1.5 inches. It is understood that other configurations and dimensions are within the scope of the present invention.

Figure 3:
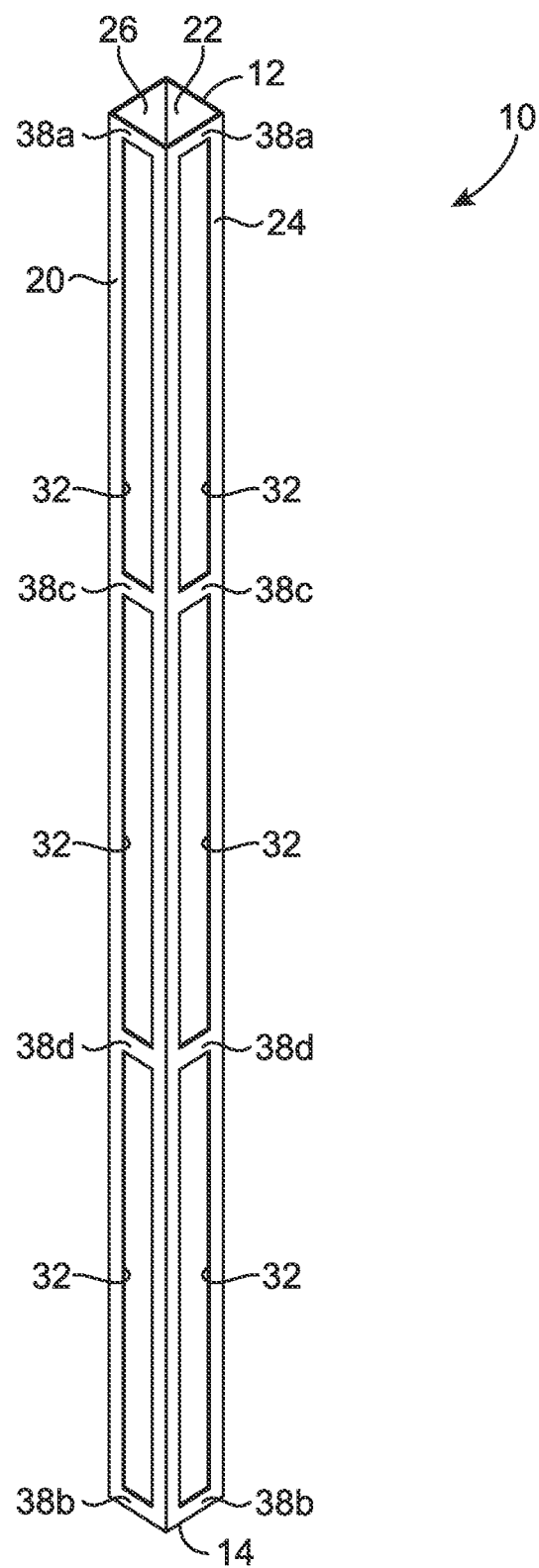
FIG. 3 is a perspective view of a hydroponic tower according to an embodiment.
Figure 4:
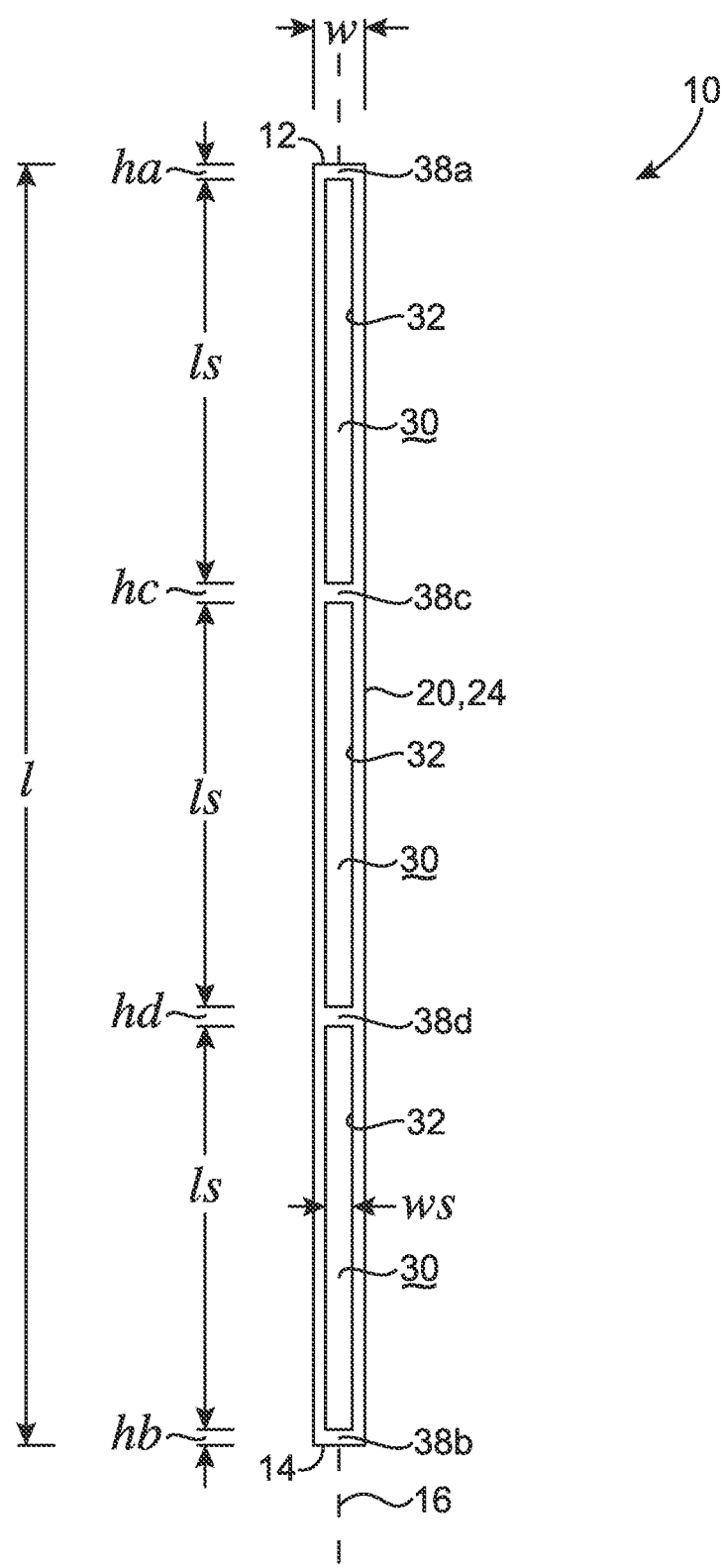
FIG. 4 is a front elevation of a hydroponic tower.
Figure 5:
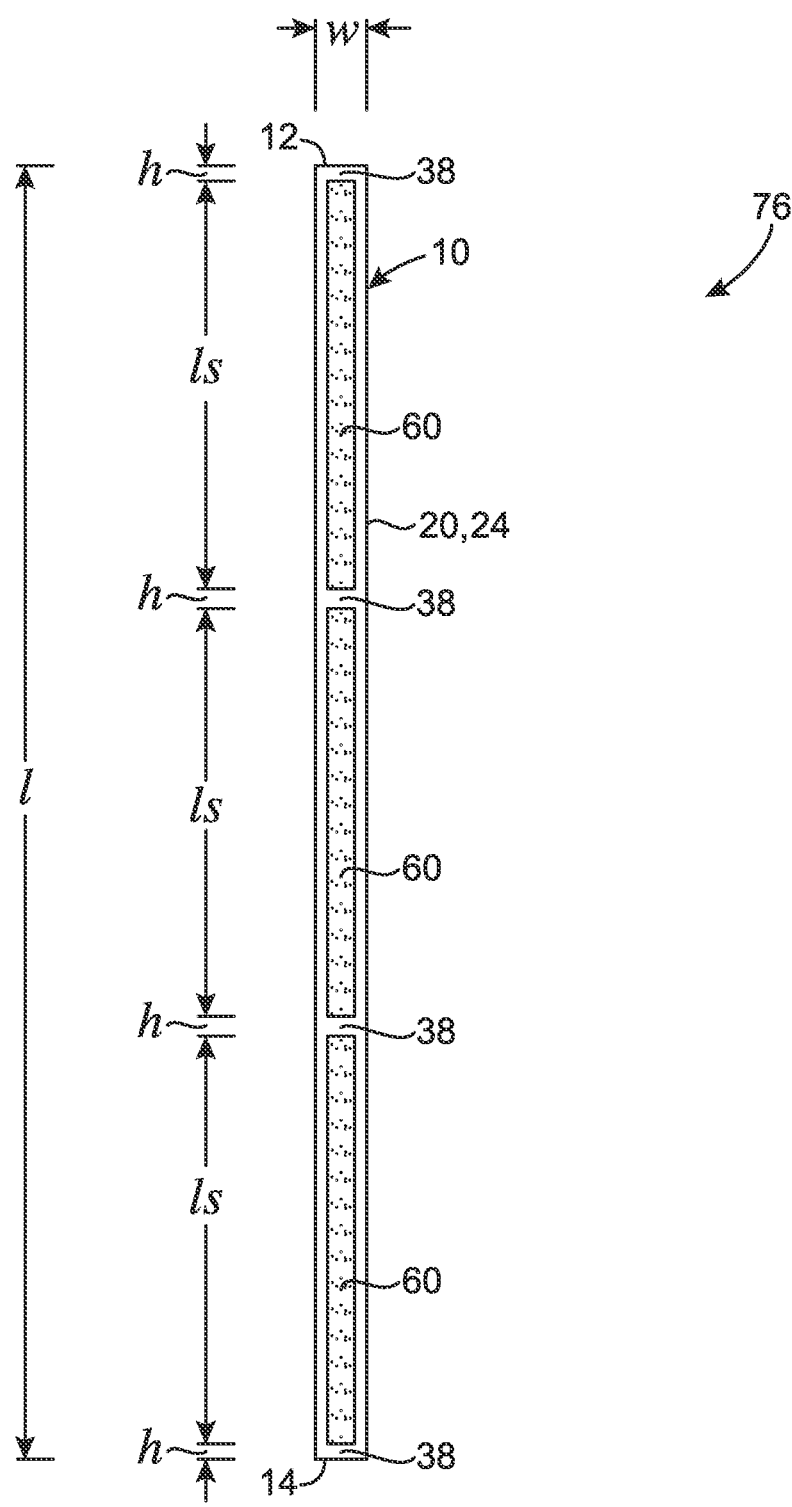
FIG. 5 is a front elevation of a hydroponic tower assembly including the hydroponic tower of FIG. 4.
Figure 6:
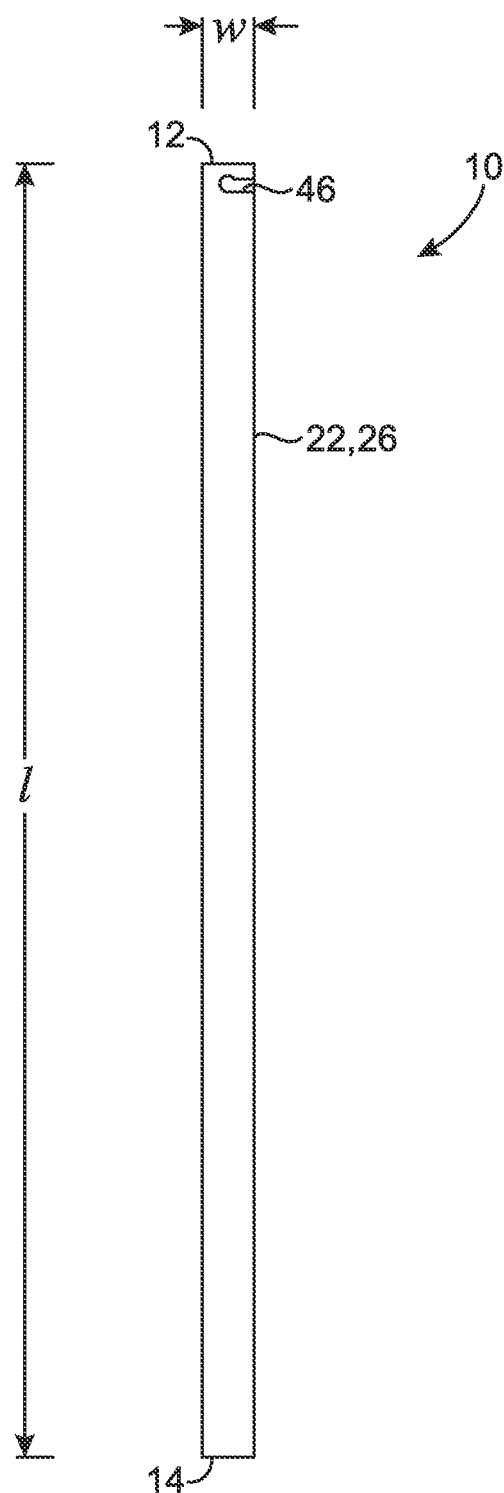
FIG. 6 is rear elevation of a hydroponic tower.
Figure 8:
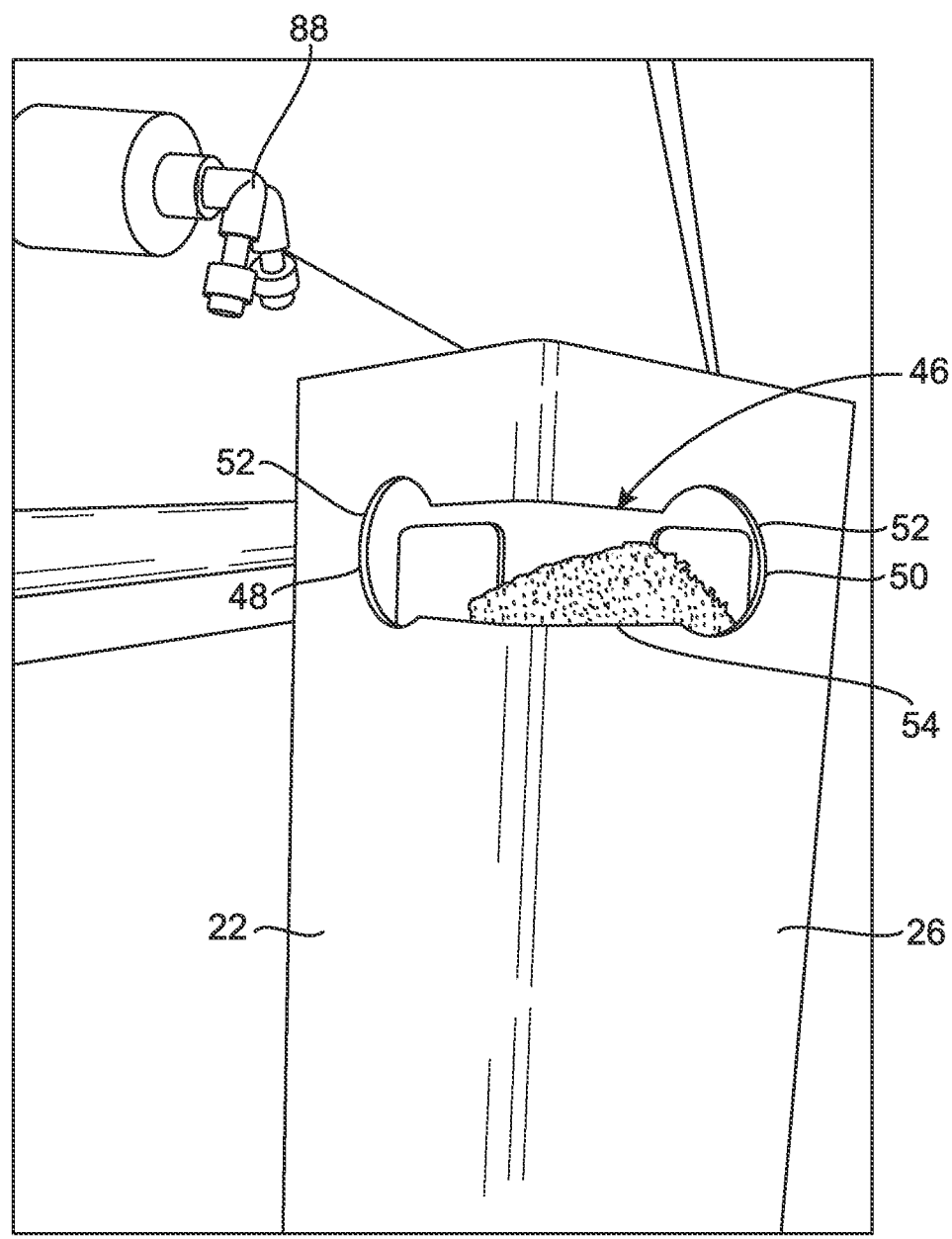
FIG. 8 is a photograph showing a mounting slot of a hydroponic tower.
Figure 9:
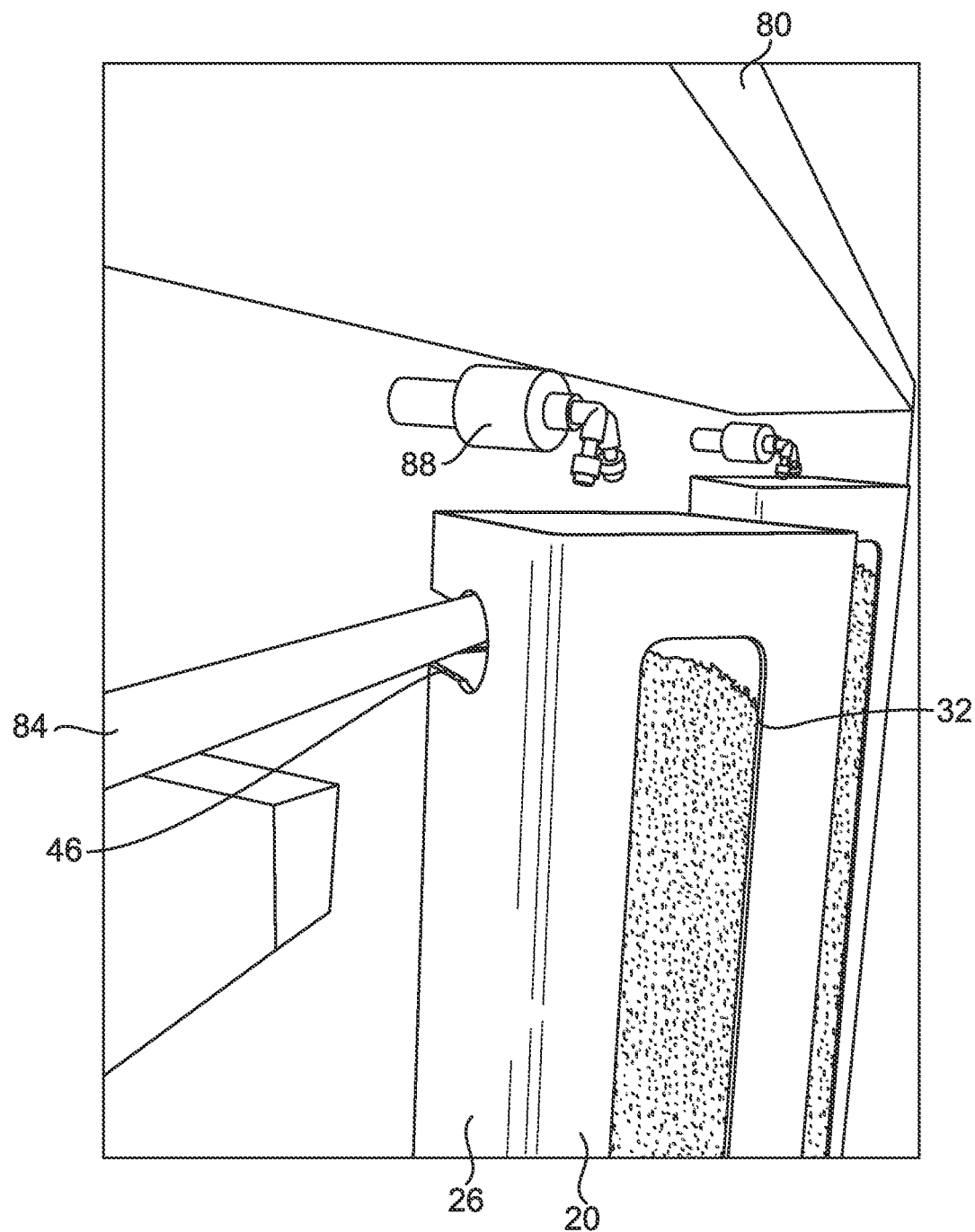
FIG. 9 is a photograph showing a hydroponic tower mounted on a mounting bar using the mounting slot.
Figure 10:
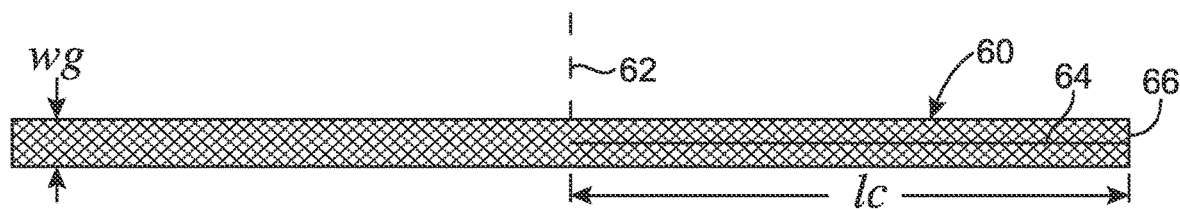
FIG. 10 is a top plan of a growing medium section.
Figure 11:
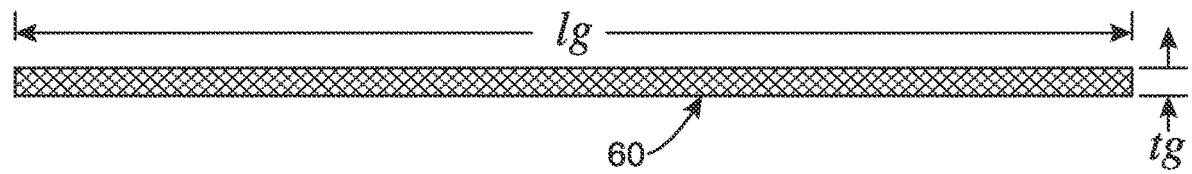
FIG. 11 is a side elevation of a growing medium section.
Figure 12:
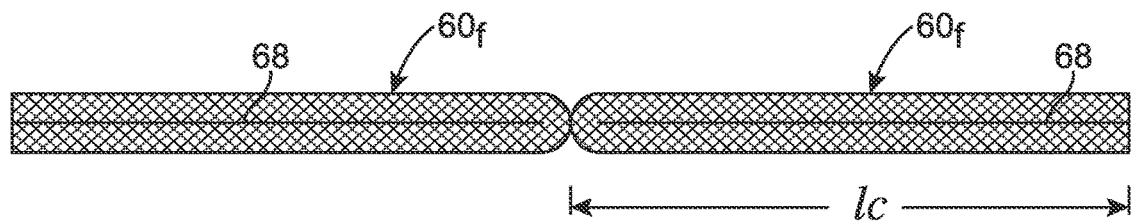
FIG. 12 is a side elevation of two folded growing medium sections.

It is understood that more or fewer growing slots 32, and the corresponding more or fewer support sections 38, can be included on each of the two adjacent sides. For example, one or both of the adjacent sides 20, 24 can include one, two, three, four, or more growing slots 32. For example, as shown in FIGS. 3-5, the slotted first and third sides 20, 24 each include three growing slots 32a-c. Each slot has a length and a width as described above. In one embodiment, the width ws of each slot is about 1.25 inches, and the length ls of each slot is about 2 feet, 6 inches. As described above, the dimensions of the slots 32 may be identical for each slot, or can vary (between sides or among slots on the same side) within the scope of the present invention. It is understood that as more slots are included in a side, the average lengths of the slots will decrease to accommodate the additional slots. In addition to top and bottom support sections 38a, 38b as described above with reference to FIG. 2, the embodiment of FIG. 3 includes two support sections 38c, 38d between the top and bottom ends of adjacent growing slots 32. As described above, the support sections 38 can have identical or varying heights (or some combination thereof) within the scope of the present invention. In one embodiment, each of the support sections 38a-d has a respective height ha-d of about 1.5 inches. Other configurations and dimensions are within the scope of the present invention. It is understood that adjacent sides 20, 24 can have differing number or configuration of growing slots 32 and support sections 38.

Referring now to FIGS. 6-9, the tower 10 can also include attachment structure configured to facilitate attachment of the tower to a base, frame, or other assembly during use of the tower to grow plants. In the illustrated embodiment, the tower 10 includes a mounting slot 46 extending between two adjacent sides. As illustrated, the mounting slot 46 extends between adjacent sides that do not include the growing slots 32 (i.e., the adjacent second and fourth sides 22, 26). The mounting slot 46 extends from a first end 48 on the second side 22 to a second end 50 on the fourth side 26. The mounting slot includes a generally rounded portion 52 at each end 48, 50, and a generally linear intermediate portion 54 extending between the two generally rounded portions. The intermediate portion 54 extends across a corner or junction between the two adjacent sides 22, 26. The mounting slot 46 is configured and dimensioned to receive a rod or bar for mounting or suspending the tower 10. Preferably, the radius of each generally rounded portion 52 is larger than a radius of the rod or bar on which the tower 10 is mounted. The intermediate portion 54 is also configured to receive the mounting rod or bar, and preferably has a height larger than the diameter or height of the mounting rod or bar. In one embodiment, the tower 10 is configured to be mounted on a 0.5 inch rod. For example, each generally rounded portion can have a radius r in the range of about 0.5 inches to about 1 inch, such as about 0.625 inches, and the intermediate portion can have a height hm in the range of about 1 inch to about 1.75 inches, such as about 1.125 inches. Depending on the size of the mounting bar or rod, the radius r and the height hm can be adjusted accordingly to permit secure attachment while facilitating easy installation. Preferably, the mounting slot 46 is spaced from the top end 12 of the tower. For example, the intermediate portion 54 can be spaced a distance d from the top end 12 of the tower in the range of about 0.75 inches to about 1.25 inches, such as about 0.75 inches. The tower 10 can be mounted on a bar as described in further detail below. It is understood that the mounting slot can have different configurations or dimensions within the scope of the present invention. Furthermore, the tower 10 can have a different attachment structure or omit the mounting slot within the scope of the present invention.

Referring to FIGS. 10-13, a growing medium section 60 configured for use with the tower 10 is illustrated. The growing medium section 60 can be made of a porous foam, or any other suitable material. In one embodiment, the growing medium section 60 is made of a reticulated medium density plastic foam. The growing medium section 60 is configured and dimensioned to fit within the hollow interior 30 of the tower 10. Preferably, the growing medium section 60 is configured and dimensioned to fit within the hollow interior 30 of the tower 10 when the growing medium section is folded in half about a central transverse axis 62. For example, when the tower 10 has a square cross section, the growing medium section 60 preferably has a thickness tg of approximately half the width of the tower 10 (e.g., about 2 inches for a 4 inch square tube tower) and a width wg approximately equal to the width of the tower (e.g., about 4 inches for a 4 inch square tube tower), such that the growing medium section when folded in half will fit in the hollow interior 30 of the tower and substantially fill the hollow interior. The growing medium section 60 has a length lg such that the growing medium section can fit within the tower 10. In one embodiment, the length lg of the growing medium is approximately equal to the length l of the tower 10, such that two growing medium sections 60 (each folded in half) will fit in the hollow interior 30 of the tower and substantially fill the hollow interior. For example, where the tower 10 has a length l of 8 feet, the growing medium section 60 can also have a length lg of 8 feet so that two sections (each folded in half to a length lf of 4 feet) will fit within the hollow interior of the tower. Other configurations and dimensions are within the scope of the present invention. For example, the growing medium section 60 need not be folded in half to fit in and substantially fill the hollow interior of the tower, the growing medium section can have a length so that one section substantially fills the hollow interior when folded in half, the growing medium can be so configured or dimensioned so that 2 or more sections fit within an substantially fill the hollow interior, or any other suitable configuration.

Figure 13:
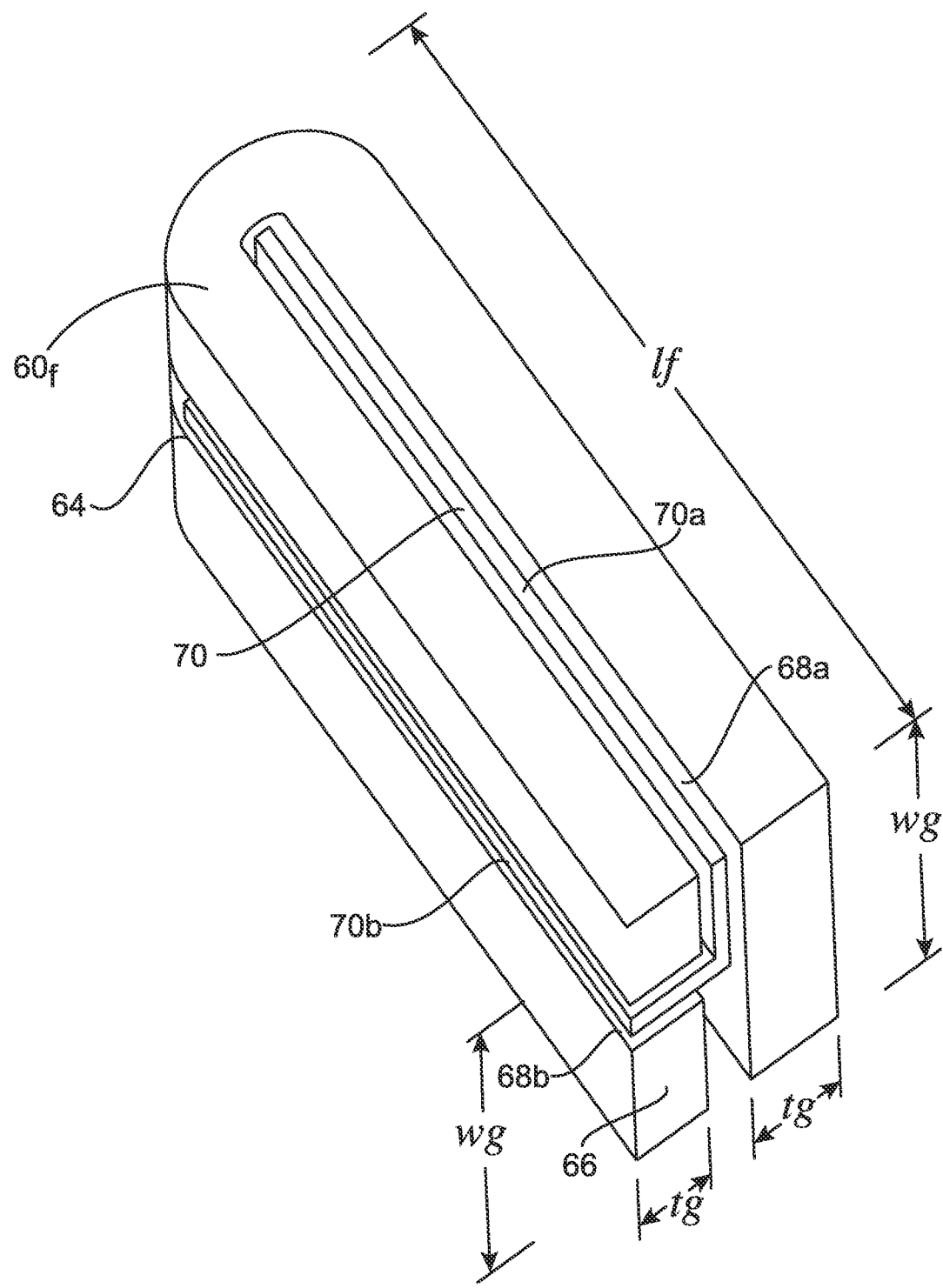
FIG. 13 is a perspective view of a folded growing medium section including a wicking strip.
Figure 14:
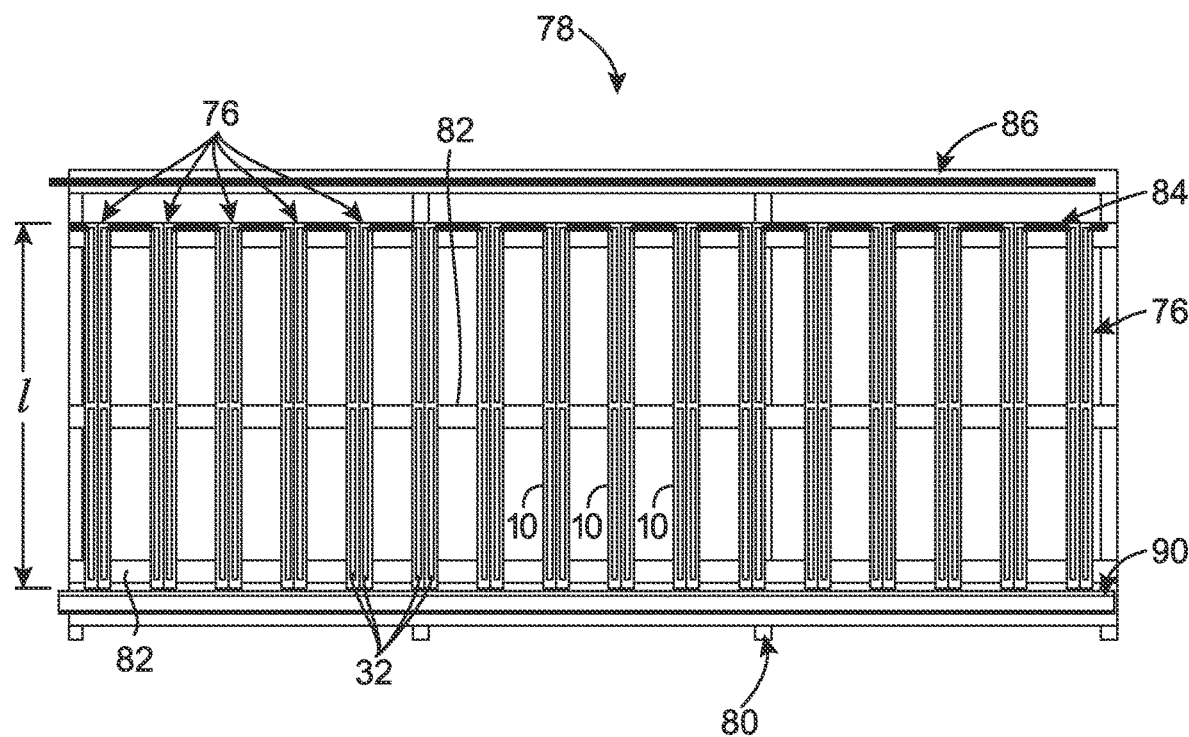
FIG. 14 is a front elevation of a growing assembly including hydroponic tower assemblies.
Figure 16:
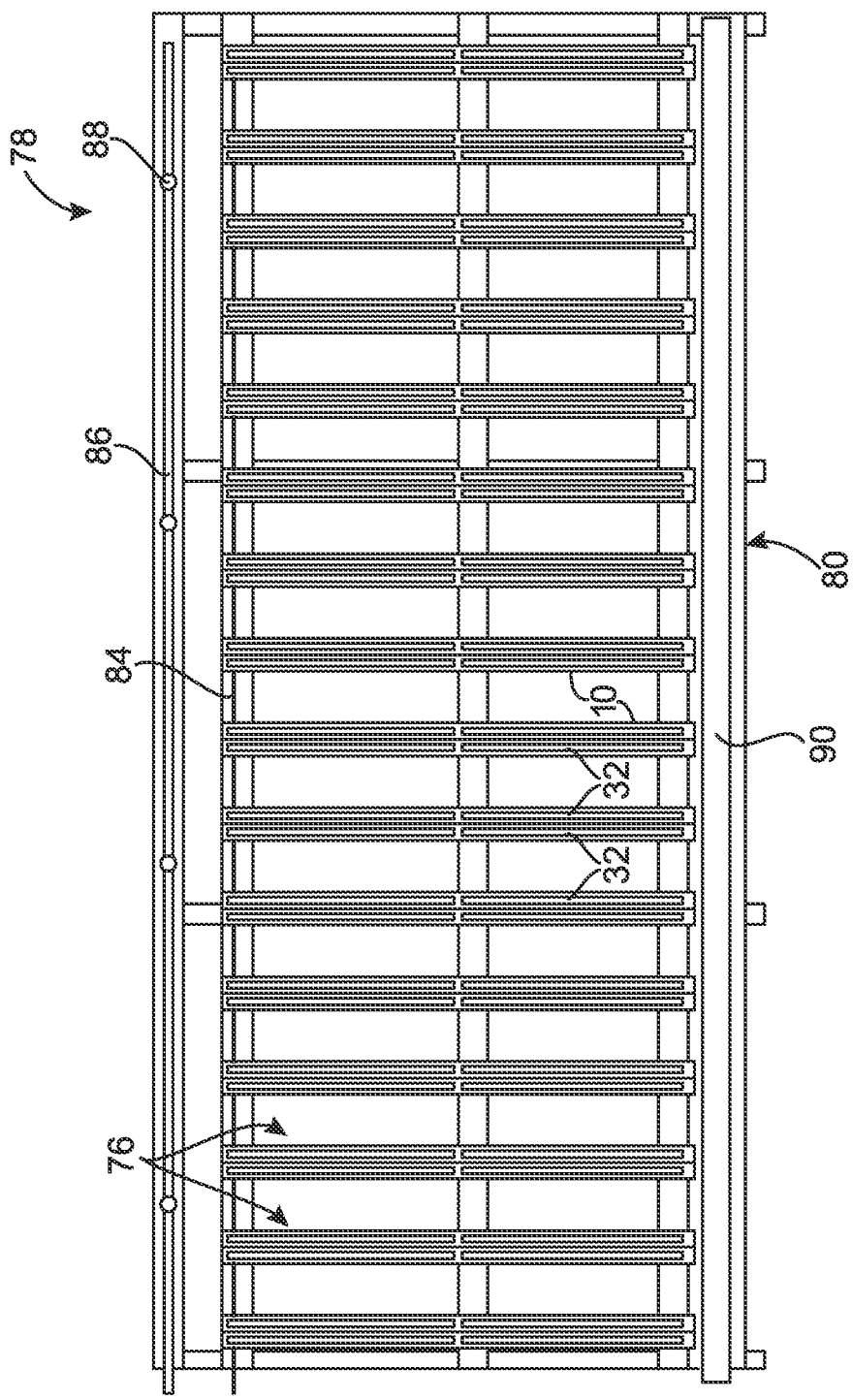
FIG. 16 is a front elevation of a growing assembly.
Figure 17:
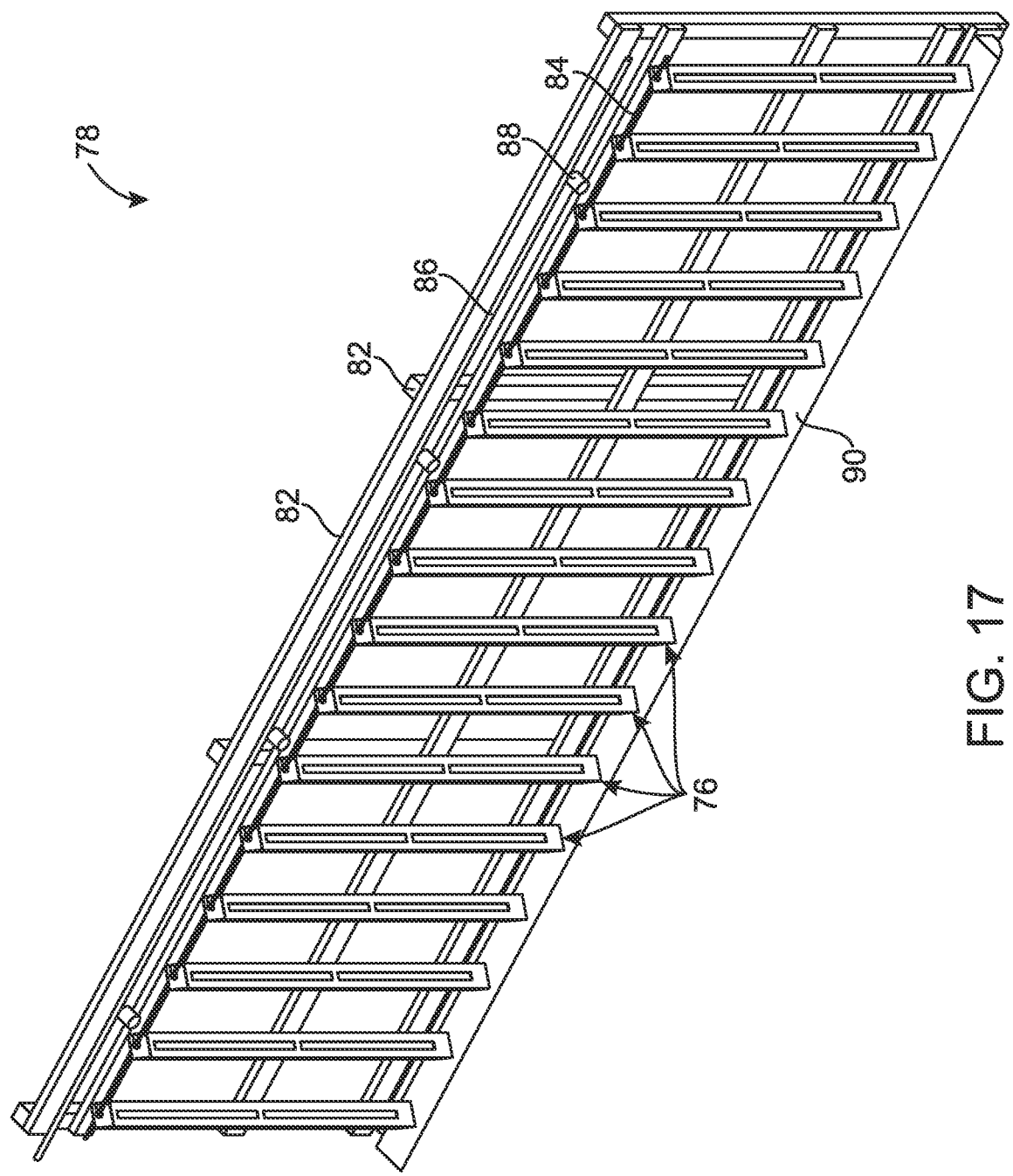
FIG. 17 is a perspective view of a growing assembly.
Figure 18:
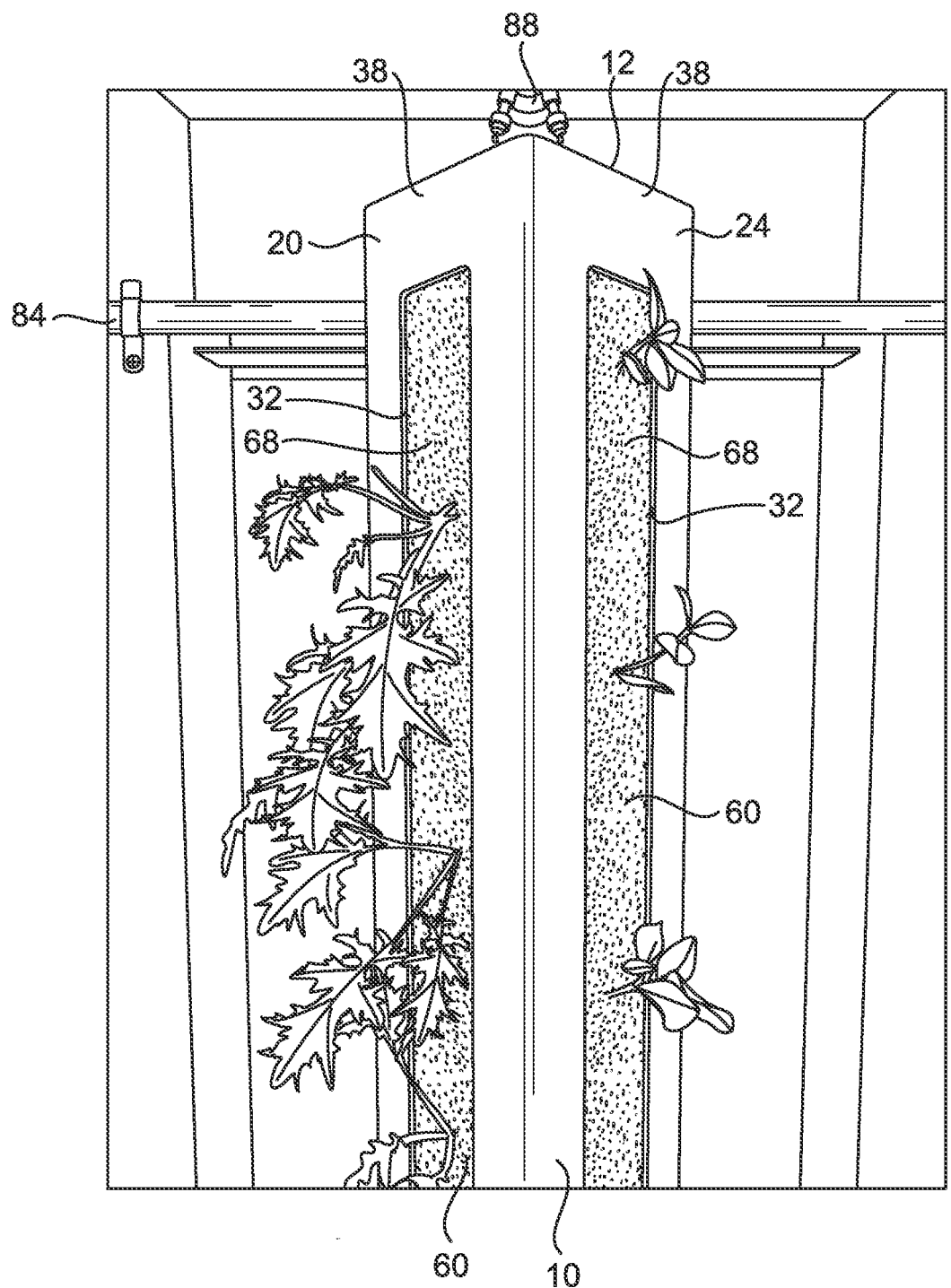
FIG. 18 is a photograph showing a growing assembly with plants growing in the hydroponic tower assembly.
Figure 19:
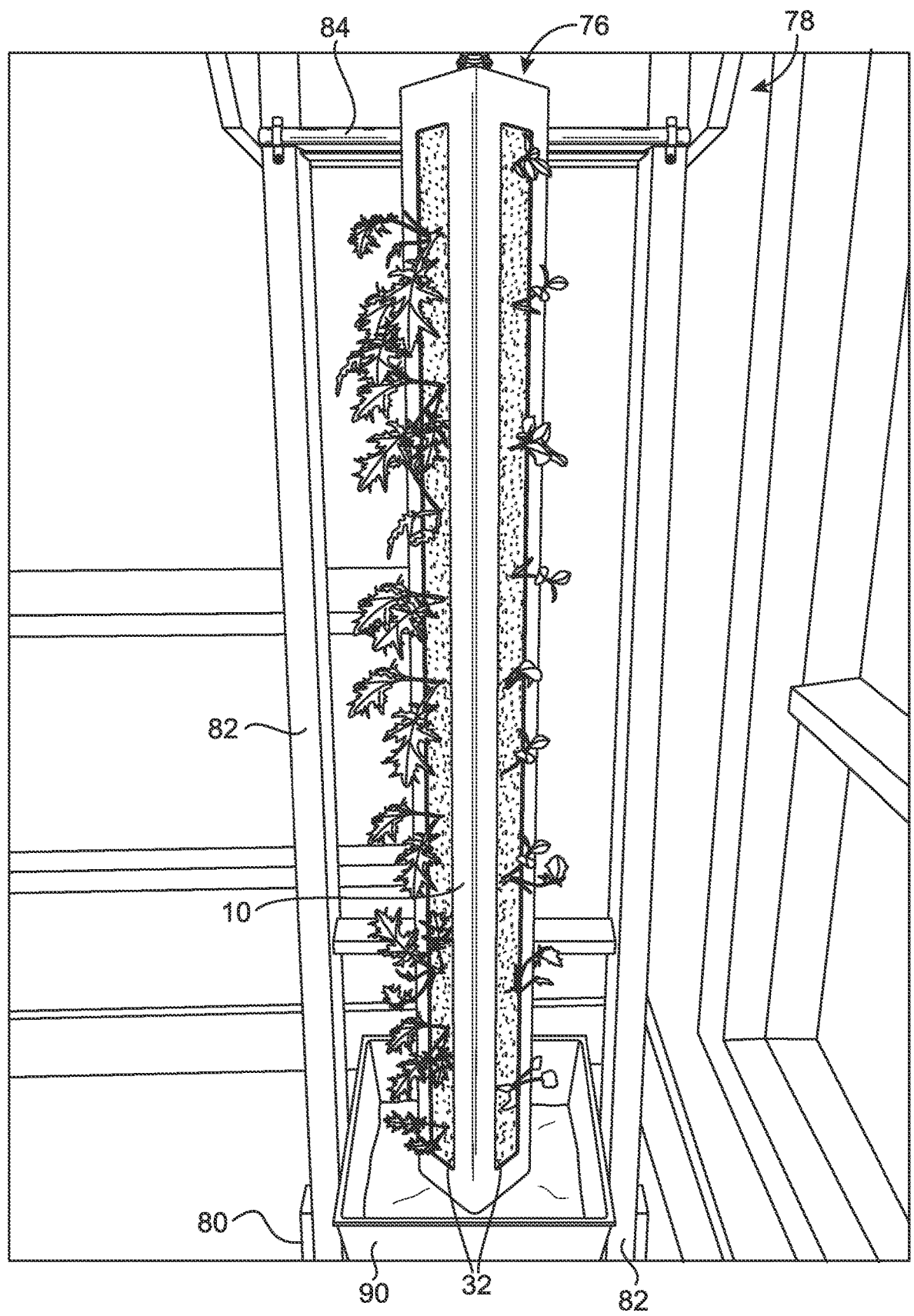
FIG. 19 is a photograph showing a growing assembly with plants growing in the hydroponic tower assembly.
Figure 20:
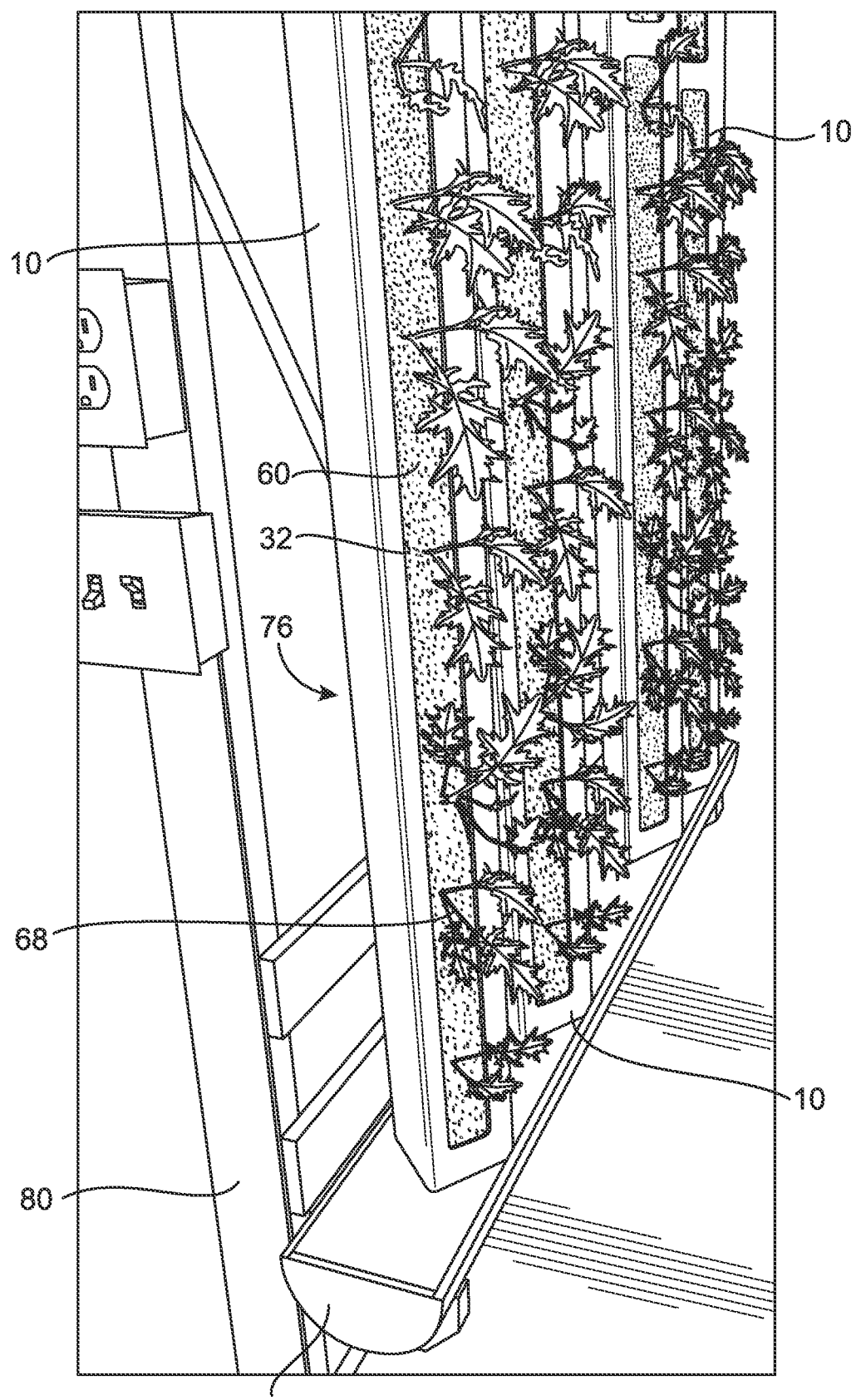
FIG. 20 is a photograph showing a growing assembly with plants growing in the hydroponic tower assembly.
Figure 21:
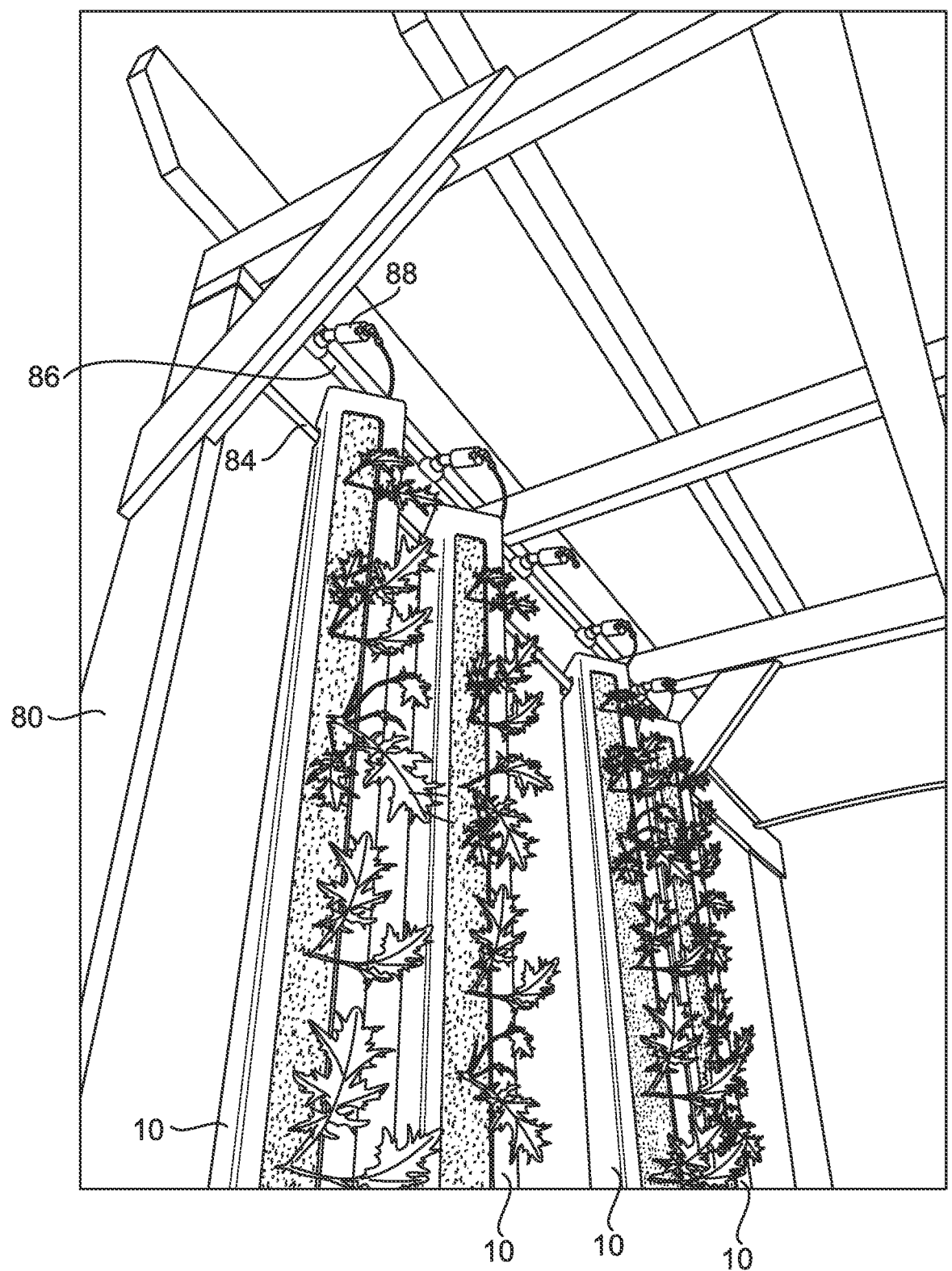
FIG. 21 is a photograph showing a growing assembly with plants growing in the hydroponic tower assembly.

Referring still to FIGS. 10-13, the growing medium section 60 includes a cut 64 extending through the thickness tg of the growing medium section from a first end 66 of the section to approximately the center of the section (e.g., to central transverse axis 62). In other words, the cut 64 has a length lc of approximately half the length lg of the growing medium section 60. This cut 64 facilitates the insertion and growing of plants through growing slots 32 on both of the two adjacent sides 20, 24. As illustrated in FIG. 13, when the growing medium section 60 is folded in half (see, e.g., folded growing medium section 60*f*), the growing medium section defines two planting openings 68. A first planting opening 68*a* is defined between the two halves of the growing medium section 60, and a second planting opening 68*b* is defined by the cut 64. The two planting openings 68 are positioned on adjacent sides of the folded growing medium section 60*f*. These openings 68 align with the growing slots 32 when the growing medium is inserted in the hollow interior 30 of the tower 10. Inserting two folded growing medium sections 60*f* into the tower 10 facilitates easier insertion as compared to inserting one longer growing medium section 60 spanning the entire length of the tower. Preferably, two folded growing medium sections 60*f* are inserted into the tower 10 such that a planting opening 68 of one of the sections aligns with each of the growing slots 32 of the tower.

The growing medium section 60 can further include a wicking strip 70 (see, e.g., FIG. 13). The wicking strip 70 can be a piece of wicking material, such as fleece or other suitable material. In one embodiment, the wicking strip 70 is made of natural, undyed wool. The wicking strip 70 is positioned such that a first portion 70*a* of the wicking strip is positioned in the first planting opening 68*a* and a second portion 70*b* of the wicking strip is positioned in the second planting opening 68*b*. In the illustrated embodiment, the wicking strip 70 is an integral piece of material that is folded to align the first and second portions 70*a,b* with the first and second plant openings 68*a, b*. The wicking strip 70 wicks liquid, such as the nutrient solution described below, through the growing medium 60 to ensure the liquid spreads across the width of the growing medium to plants inserted into the growing medium. The wicking strip also ensures that the nutrient solution is distributed through the growing medium to any plants planted therein in a consistent and controlled manner, rather than simply rushing through the porous growing medium and out the bottom end of the tower. Other configurations are within the scope of the present invention, or the wicking strip may be omitted within the scope of the present invention.

The tower 10, growing medium 60, and optional wicking strip 70 are assembled to form a hydroponic tower assembly 76. As described above, folded growing medium sections 60*f* are inserted into the hollow interior 30 of the tower 10 such that planting openings 68 align with growing slots 32. The hydroponic tower assembly 76 can then be used to grow plants. For example, roots or a bulb of a plant can be inserted into the plant openings 68. Multiple plants can be so inserted into the growing medium 60 in the tower and arranged vertically along each growing slot 32 of the tower. If the hydroponic tower assembly 76 includes a wicking strip 70 in one or more of the growing medium sections, plants can be inserted in the plant opening 68 such that each plant is positioned between the wicking strip and the growing medium.

In one embodiment, the hydroponic tower assembly 76 can be used in a growing apparatus or assembly 78 including one or more tower assemblies 76 mounted on a base or frame 80 (see, e.g., FIGS. 14-21). The frame 80 can include multiple structural supports 82, including horizontal and vertical supports. A mounting bar 84 is attached to a horizontal support 80 and extends along a length of the growing apparatus 78. The mounting bar 84 is configured and positioned to suspend each tower assembly 76 in a vertical orientation. The mounting slot 46 of each tower 10 in the assembly 78 is configured to receive the mounting bar 84 to secure the tower to the mounting bar. When the mounting slot 46 of the tower is positioned so that the mounting bar 84 is received therein, the tower 10 hangs from the mounting bar in a generally vertical orientation. Mounting the tower by hanging on a mounting bar at the mounting slot permits the tower to be gravity-plumbed. When the tower 10 is mounted on the bar 84, the tower is positioned at an angle relative to the mounting bar. As seen in FIGS. 9 and 14-21, the tower 10 is mounted such that a corner or junction between the second and fourth sides 22, 26 is positioned closest to the frame and a corner or junction between the first and third sides 20, 24 is positioned farthest from the frame. When the tower is mounted, none of the sides 20, 22, 24, 26 are parallel to the mounting bar 84. That is, according to one embodiment, at least one, two, three and/or even all of the sides 20, 22, 24 and/or 26 may form less than a 90° angle with the mounting bar 84 when the tower is mounted. This angled orientation of the tower 10 provides easy access to both of the adjacent sides 20, 24, and the growing slots 32 of those sides. Furthermore, the angled orientation may, in certain embodiments, permit more towers to fit on a mounting bar.

The growing assembly 78 further includes an irrigation pipe 86 having nozzles 88 or other distribution structure. The irrigation pipe 86 is attached to the frame 80 such that the nozzles 88 are positioned above the one or more tower assemblies 76 mounted to the frame for distribution of water and nutrients (e.g., in a nutrient solution) to the top of each tower 10. The nutrient solution will flow down each tower 10 through the growing medium 60 and wicking strip 70 to provide water and nutrients to plants planted in the tower. The nutrient solution includes water soluble nutrients for distribution throughout the growing medium to plants planted in the tower. The nutrients in the solution can vary depending on the growing needs of the plants. A trough 90 (e.g., a half round gutter) is mounted on the frame and positioned below the one or more tower assemblies 76 to capture any excess nutrient solution that exits the bottom of the tower(s) 10. Preferably, each tower 10 is suspended above the trough 90. The excess captured nutrient solution is pumped (e.g., by a pump (not shown)) back up to the nozzles for redistribution to the towers. As shown in FIGS. 14-17 and 20-21, multiple tower assemblies 76 can be mounted on a frame 80. Although only one side of the frame is illustrated as having tower assemblies 76, in one embodiment both sides of the frame can include a mounting bar, tower assemblies, irrigation pipe, nozzles, and trough. Multiple growing assemblies 78 can be positioned in a facility to provide high-output hydroponic production of plants and produce. Other features of the facility can include lights (e.g., LED lights), supply and return tanks, pumps, temperature control, and any other structures or components to facilitate monitoring and controlling growing conditions for optimal production. Alternatively, residential use tower assemblies can be mounted on smaller frames 78 for smaller scale growing assemblies 78, such as the growing assembly illustrated in FIG. 19 having a single hydroponic tower assembly.

Figure 22:
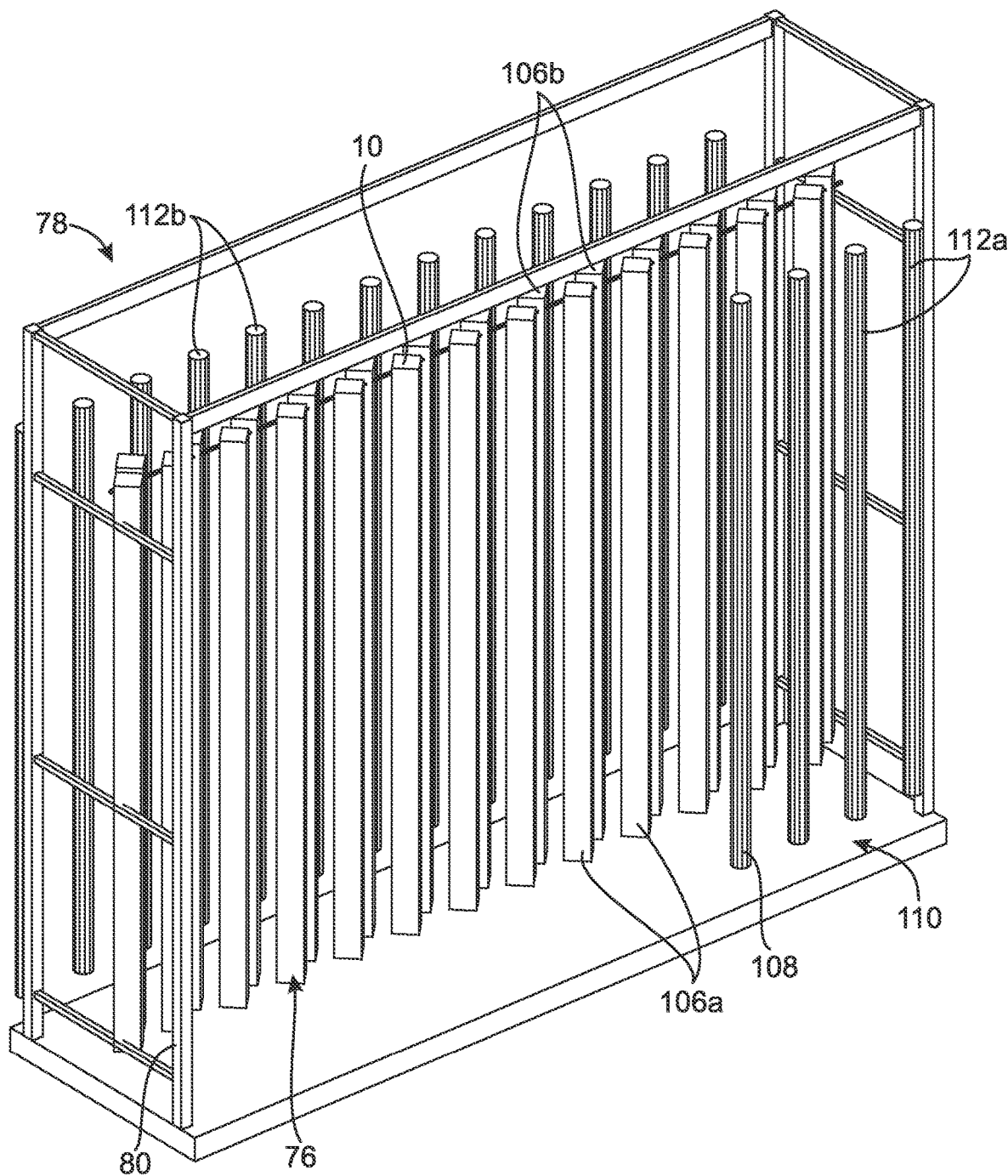
FIG. 22 is a perspective view of another embodiment of a growing assembly.
Figure 23:
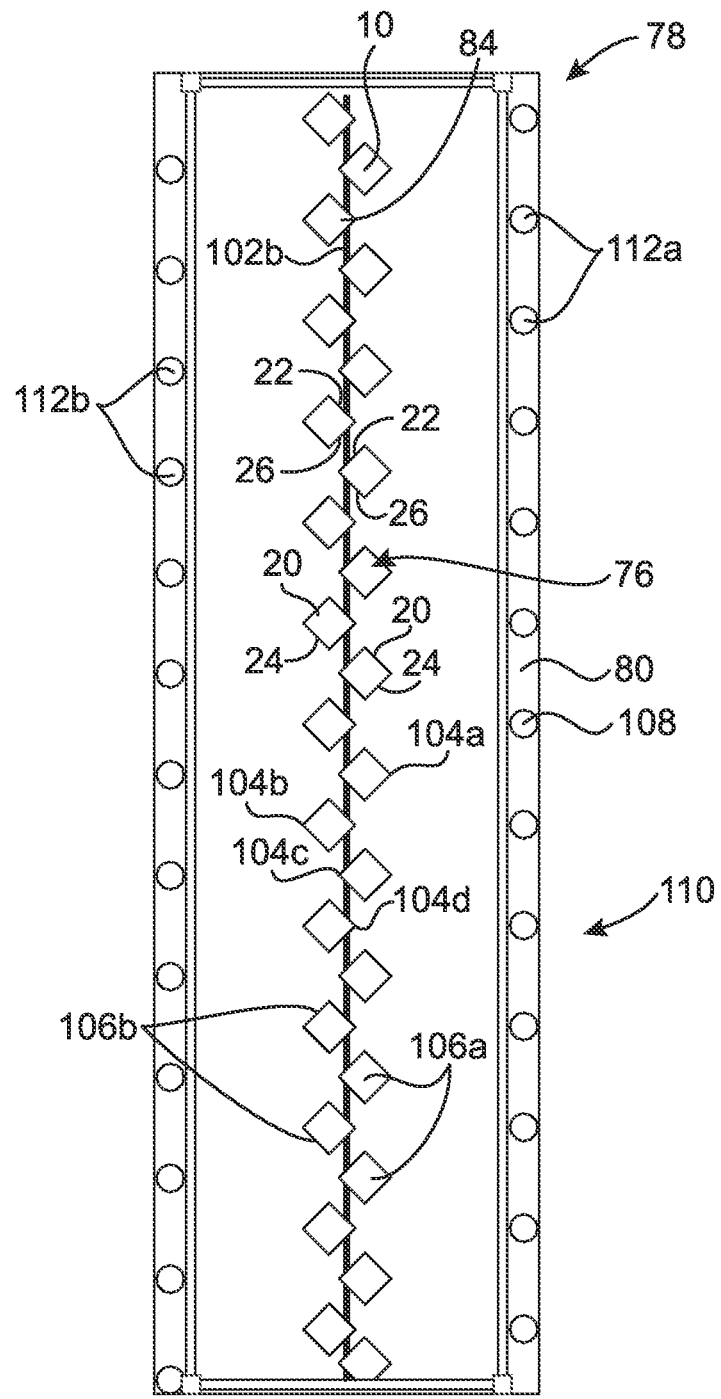
FIG. 23 is a top view of the growing assembly of FIG. 22.

Referring to FIGS. 22-23, yet another embodiment of a growing assembly 78 having multiple tower assemblies 76 mounted on a frame 80 is shown. According to the embodiment as shown, the tower assemblies 76 may be mounted on a mounting bar 84 such that a first set 106a of tower assemblies 76 on a first side 102a of the mounting bar 84 are mounted in a direction opposite a second set 106b of tower assemblies 76 on a second side 102b of the mounting bar 84. For example, the first and second sets 106a, 106b of tower assemblies 76 may be in an opposing relation to one another, such that a corner or junction 104a between the first and third sides 20, 24 of the tower assemblies 76 in the first set 106a faces a direction opposing that of a corner or junction 104b between the first and third sides 20, 24 of the tower assemblies 76 in the second set 106b. Furthermore, a corner of junction 104c between the second and fourth sides 22, 26 (e.g., the corner or junction having a mounting slot 46) of the tower assemblies in the 76 in the first set 106a, and a corner of junction 104d between the second and fourth sides 22, 26 (e.g., the corner or junction having a mounting slot 46) of the tower assemblies in the 76 in the second set 106b, may be mounted on the bar 84 such that the corners or junctions 104c, 104d of the respective tower assemblies are adjacent to one another along the mounting bar 84. That is, according to certain embodiments, the tower assemblies 76 can be mounted in an alternating fashion along the longitudinal axis of the mounting bar 84, with the tower assemblies in the first set 106a that are mounted on the first side 102a of the mounting bar 84 alternating with tower assemblies in the second set 106b that are mounted on the second side 102b of the mounting bar 84. According to certain embodiments, by providing the first and second sets 106a, 106b of tower assemblies 76 that are mounting in the alternating and opposing fashion on the same mounting bar 84, the space requirements of the growing assembly 78 can be decreased, such as for example in comparison to providing the first and second sets 106a, 106b of tower assemblies 76 facing a same direction (and/or different directions) on different mounting bars.

Furthermore, while the growing assembly 78 of FIGS. 22 and 23 are depicted with tower assemblies mounted on first and second sides of the mounting bar in an alternating fashion, the tower assembly 76 may also in certain embodiments comprise a set of tower assemblies 76 all of which face a same direction and which are mounted on the same mounting bar, or may comprise a combination of alternating and same-side mounting of the tower assemblies on the mounting bar. The growing assembly 78 may further comprise a plurality of mounting bars 84 supported by one or more frames 80, with configurations of tower assemblies 76 mounted thereon, such as in an same-side or alternating fashion, or a combination thereof.

According to yet another embodiment, referring again to FIGS. 22-23, a lighting system 110 can be provided to irradiate the tower assemblies 76 and provide a source of light for growth of plants provided in the growing assemblies 78. The lighting system 110 can be used as a supplement to natural lighting sources, or may be used as the sole light source in a case where natural light is not abundantly available, such as in a relatively windowless space. In one embodiment, the lighting system 110 comprises a plurality of individual light emitting devices 108, such as for example LED bar lights, that are positioned to direct light towards one or more of the tower assemblies 76 in the growing assembly 78. In one embodiment, the light emitting devices 108 comprise a series of devices that are positioned along a frame structure parallel to a set of tower assemblies 76 mounted on the mounting bar 84, with each device being located at a position that is in between adjacent tower assemblies 76, such as roughly equidistant between the tower assemblies 76. For example, a distance between adjacent light emitting devices 108 in the series may be substantially the same as a distance between adjacent tower assemblies 76 mounted along the mounting bar and facing the series of light emitting devices. In the embodiment as shown in FIG. 23, placement of the light emitting devices 108 may allow for light to be directed to first and third sides 20, 24 of adjacent tower assemblies 76. For example, each light emitting device 108 may be capable of directing light towards the growing slots 32 formed in the first and third sides of the adjacent tower assemblies 76 that face the light emitting device 108.

In the embodiment as shown in the configuration of FIG. 22, the light emitting devices 108 comprise devices that are configured to emit light that is directed along most of the length, and even substantially the entire length of the tower assemblies 76 and/or growing slots 32 formed therein. For example, the light emitting devices 108 may be capable of providing light along a vertical direction of the growing slots, such that the plants within the growing slots receive light along the length of the slots, from a bottom of the slots, along the middle, and to a top of the slots. In the embodiment as shown in FIG. 22, the light emitting devices 108 comprise LED bar lights having an elongated shape that extends along a vertical direction of the growing slots 32. In yet another embodiment, a plurality of light emitting devices 108 may be provided along a vertical direction of the slots to provide light along a length thereof.

In the configuration as shown in FIG. 23, the lighting system 110 comprises a first series 112a of devices 108 that are positioned facing the first set 106a of tower assemblies 76 that are mounted on the first side 102 of the mounting bar 84, and a second series 112b of devices 108 that are positioned facing the second set 106b of tower assemblies 76 that are mounted on the second side 102b of the mounting bar 84. In yet another embodiment, the lighting system 110 can comprise a series of devices that are positioned facing just one side of the mounting bar on which a set of tower assemblies is mounted, such as for example when the tower assemblies are all mounted facing a same side of the mounting bar 84. The lighting system 110 can also comprise other configurations, orientations and types of light emitting devices 108, to provide light that enhances the growth of plants provided in the growing slots 32.

The hydroponic tower, hydroponic tower assembly, and growing assembly as disclosed and described above facilitate efficient plant growth. The vertical towers can be easily mounted to a mounting bar without requiring additional structure or fasteners. This configuration permits a user to mount the tower while standing on the ground, and without requiring a ladder or additional tools or components. Thus, the tower as disclosed and described is safer to mount than other towers that require the use of ladders or tools for attachment. The growing slots on a pair of adjacent sides of the tower permit additional plant production as compared to previous hydroponic towers. In addition, the skewed mounting of the towers, facilitated by the mounting slot construction, permits more towers to fit in a space. The configuration and construction of the towers, including the support sections, permits the additional production without compromising the structural integrity of the towers.

It will be understood that various features of the aspects of the apparatus and methods described herein may be used in combination with, or instead of, particular features of another aspect. Having provided the disclosure in detail, it will be apparent that modifications and variations are possible without departing the scope of the disclosure defined in the appended claims. Furthermore, it should be appreciated that all examples in the present disclosure are provided as non-limiting examples.

What is claimed is:

1. A growing assembly comprising:
a base comprising vertical and horizontal supports and having a mounting bar secured to a horizontal support;
a hydroponic tower assembly attached to the base at an angle, the hydroponic tower assembly including:
a hydroponic tower comprising a rectangular tube having growing slots in a first pair of adjacent sides and a mounting slot extending between a second pair of adjacent sides, the mounting slot receiving the mounting bar of the base to attach the hydroponic tower assembly to the base at an angle, such that none of the sides of the hydroponic tower are parallel to the mounting bar;
wherein each side of the first pair of adjacent sides has a first growing slot and a second growing slot that are vertically spaced apart from each other by a support section disposed in between the first and second growing slots; and
a growing medium positioned within a hollow interior of the hydroponic tower;
a trough attached to the base and positioned below a bottom end of the hydroponic tower; and
an irrigation pipe attached to the base and positioned above a top end of the hydroponic tower, the irrigation pipe including nozzles positioned to distribute a nutrient solution to the top end of the hydroponic tower.

2. A method of assembling a hydroponic tower assembly, the method comprising:
providing a hydroponic tower comprising a rectangular tube having growing slots in a first pair of adjacent sides;
providing a growing medium section;
creating a first plant opening in the growing medium section, wherein creating the first plant opening comprises cutting through a thickness of the growing medium section, the cut extending from an end of the growing medium section along a length thereof to a central transverse axis of the growing medium section;
creating a second plant opening in the growing medium section, wherein creating the second plant opening comprises folding the growing medium section about the central transverse axis; and
inserting the growing medium section into a hollow interior of the hydroponic tower such that the first and second plant openings align with the growing slots.

3. The method of claim 2, further comprising inserting a wicking strip into the growing medium section such that a first portion of the wicking strip is positioned in the first plant opening and a second portion of the wicking strip is positioned in the second plant opening.

4. The growing assembly of claim 1, wherein each side of the first pair of adjacent sides of the hydroponic tower has more than two growing slots that are vertically spaced apart from each other by a support section disposed in between the adjacent growing slots.

5. The growing assembly of claim 4, wherein each side of the first pair of adjacent sides of the hydroponic tower has a first growing slot that is above and vertically spaced apart from a second growing slot by a first support section disposed in between the first and second growing slots, and a third growing slot that is below and vertically spaced apart from the second growing slot by a second support section disposed in between the second and third growing slots.

6. The growing assembly of claim 1, wherein the growing medium comprises two growing medium sections positioned within the hollow interior of the hydroponic tower.

7. The growing assembly of claim 1, wherein the growing medium comprises plant openings aligned with the growing slots of the hydroponic tower.

8. The growing assembly of claim 7, further comprising a wicking strip positioned in the growing medium plant openings.

9. The growing assembly of claim 1, wherein the growing medium comprises:
a first folded growing medium section defining a first plant opening and a second plant opening; and a second folded growing medium section defining a first plant opening and a second plant opening.

10. The growing assembly of claim 1, wherein the growing slots have a length in a range of from 60.96 cm to 236.22 cm (24 inches to 93 inches).

11. The growing assembly of claim 1, wherein each side of the first pair of adjacent sides comprising a first support section separating an upper growing slot from the top end of the hydroponic tower, and a second support section separating a lower growing slot from the bottom end of the hydroponic tower.

* * * * *